(12) United States Patent
Liu et al.

(10) Patent No.: US 11,553,519 B2
(45) Date of Patent: Jan. 10, 2023

(54) METHOD FOR CONFIGURING CONTENTION FREE RANDOM ACCESS RESOURCE, USER EQUIPMENT AND NETWORK DEVICE

(71) Applicant: VIVO MOBILE COMMUNICATION CO., LTD., Guangdong (CN)

(72) Inventors: Siqi Liu, Chang'an Dongguan (CN); Zichao Ji, Chang'an Dongguan (CN); Jianping Zhou, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 19 days.

(21) Appl. No.: 17/039,121

(22) Filed: Sep. 30, 2020

(65) Prior Publication Data
US 2021/0014889 A1 Jan. 14, 2021

Related U.S. Application Data

(63) Continuation of application No. PCT/CN2019/080992, filed on Apr. 2, 2019.

(30) Foreign Application Priority Data

Apr. 4, 2018 (CN) .......................... 201810301951.0

(51) Int. Cl.
*H04W 74/02* (2009.01)
*H04W 74/08* (2009.01)
(Continued)

(52) U.S. Cl.
CPC .......... *H04W 74/02* (2013.01); *H04B 7/0626* (2013.01); *H04L 5/0051* (2013.01);
(Continued)

(58) Field of Classification Search
CPC .......... H04W 56/001; H04W 74/0833; H04W 74/008; H04W 74/02; H04W 74/04;
(Continued)

(56) References Cited

U.S. PATENT DOCUMENTS

2013/0242730 A1 9/2013 Pelletier et al.
2013/0301541 A1 11/2013 Mukherjee et al.
(Continued)

FOREIGN PATENT DOCUMENTS

CN 104053244 A 9/2014
CN 104186010 A 12/2014
(Continued)

OTHER PUBLICATIONS

Chinese Office Action issued in corresponding application No. 201810301951.0, dated Sep. 18, 2020.
(Continued)

*Primary Examiner* — Derrick V Rose
(74) *Attorney, Agent, or Firm* — Maschoff Brennan

(57) ABSTRACT

A method and a device for configuring a contention free random access resource are provided. The method includes: transmitting target resource indication information to a user equipment based on a pre-defined mapping relationship; where the target resource indication information is used to determine a physical random access channel transmission occasion (RO) resource, the target resource indication information includes at least one of a physical random access channel (PRACH) mask index or an RO resource index, and the pre-defined mapping relationship includes a correspondence between a value range of the target resource indication information and the RO resource.

20 Claims, 3 Drawing Sheets

---

Transmit target resource indication information to a user equipment based on a pre-defined mapping relationship, where the target resource indication information is used to determine a physical random access channel transmission occasion (RO) resource, the target resource indication information includes at least one of: a physical random access channel (PRACH) mask index or an RO resource index (RO index), and the pre-defined mapping relationship includes a correspondence between a value range of the target resource indication information and the RO resource — 101

(51) Int. Cl.
*H04W 74/00* (2009.01)
*H04W 56/00* (2009.01)
*H04B 7/06* (2006.01)
*H04L 5/00* (2006.01)

(52) U.S. Cl.
CPC ....... *H04W 56/001* (2013.01); *H04W 74/008* (2013.01); *H04W 74/0833* (2013.01)

(58) Field of Classification Search
CPC ........... H04W 72/0446; H04W 74/006; H04W 74/0866; H04B 7/0626; H04L 5/0051; H04L 5/0091; H04L 5/0007; H04L 5/0053
See application file for complete search history.

(56) References Cited

U.S. PATENT DOCUMENTS

| | | | |
|---|---|---|---|
| 2017/0013628 A1 | 1/2017 | Kim et al. | |
| 2018/0063799 A1 | 3/2018 | Sadek et al. | |
| 2018/0206271 A1 | 7/2018 | Chatterjee et al. | |
| 2021/0037487 A1* | 2/2021 | Ohara | H04W 74/0833 |
| 2021/0092775 A1* | 3/2021 | Uchino | H04W 74/0833 |

FOREIGN PATENT DOCUMENTS

| | | |
|---|---|---|
| CN | 106304383 A | 1/2017 |
| CN | 106941702 A | 7/2017 |
| CN | 107517501 A | 12/2017 |
| CN | 107690766 A | 2/2018 |

OTHER PUBLICATIONS

International Search Report and Written Opinion issued in corresponding application No. PCT/CN2019/080992, dated Oct. 15, 2020.
"Remaining Details of RACH Procedures", 3GPP TSG RAN WG1 Meeting #92, R1-1801331, Athens, Greece, Feb. 26-Mar. 2, 2018.
"Remaining Details of RACH Procedure", 3GPP TSG RAN WG1 Meeting #92, R1-1802946, Athens, Greece, Feb. 26-Mar. 2, 2018.
"3rd Generation Partnership Project; Technical Specification Group Radio Access Network; Evolved Universal Terrestrial Radio Access (E-UTRA); Medium Access Control (MAC) protocol specification (Release 15)" 3GPP TS 36.321 V15.1.0, (Mar. 2018).
"3rd Generation Partnership Project; Technical Specification Group Radio Access Network; NR; Physical channels and modulation (Release 15)"3GPP TS 38.211 V15.1.0 (Mar. 2018).
EP Search Report in Application No. 19781416.3 dated May 12, 2021.
"Discussion on non-contention based random access" 3GPP TSG-RAN WG2 Meeting #99, R2-1709259, Huawei, HiSilicon, Aug. 21, 2017.
"[D312/322] RACH resources for contention-free RA including BFR" 3GPP TSG-RAN WG2 #101, R2-1803777, NTT DOCOMO, Inc., Feb. 26, 2018.
JP Office Action in Application No. 2020-554281 dated Jan. 4, 2022.
"BWP selection and RA" Ericsson, 3GPP TSG-RAN WG2 #101, Tdoc R2-1803203, Feb. 25, 2018.

* cited by examiner

Transmit target resource indication information to a user equipment based on a pre-defined mapping relationship, where the target resource indication information is used to determine a physical random access channel transmission occasion (RO) resource, the target resource indication information includes at least one of: a physical random access channel (PRACH) mask index or an RO resource index (RO index), and the pre-defined mapping relationship includes a correspondence between a value range of the target resource indication information and the RO resource ——101

Fig. 1

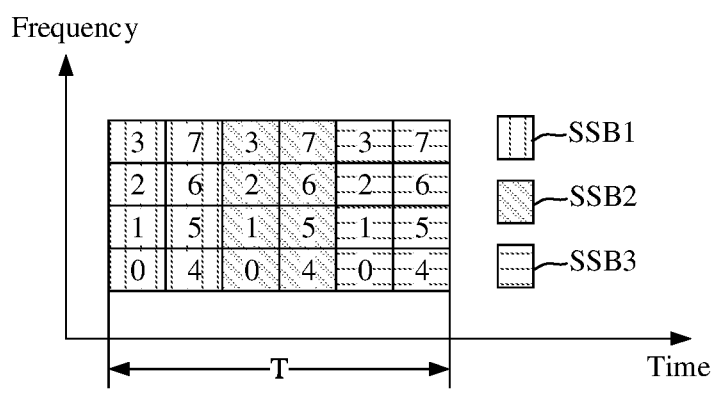

Fig. 2

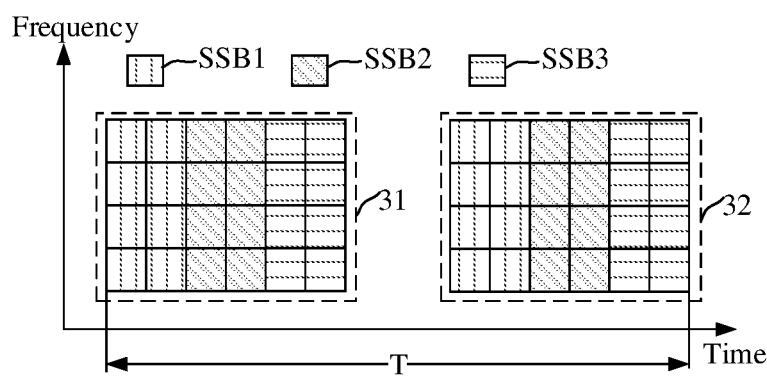

Fig. 3

METHOD FOR CONFIGURING CONTENTION FREE RANDOM ACCESS RESOURCE, USER EQUIPMENT AND NETWORK DEVICE

CROSS-REFERENCE TO RELATED APPLICATION

This application is continuation application of PCT International Application No. PCT/CN2019/080992 filed on Apr. 2, 2019, which claims a priority to Chinese Patent Application No. 201810301951.0 filed on Apr. 4, 2018, the disclosures of which are incorporated in their entireties by reference herein.

TECHNICAL FIELD

The present disclosure relates to the technical filed of communications, and in particular to a method for configuring a contention free random access resource, a user equipment and a network device.

BACKGROUND

In a long term evolution (Long Term Evolution, LTE) system, for a contention free random access procedure, a network device transmits, to a user equipment, information carrying a preamble index (preamble index) and a physical random access channel (Physical Random Access Channel, PRACH) mask index (mask index), to instruct the user equipment to transmit, on a PRACH resource indicated by the PRACH mask index, a preamble (preamble) corresponding to the preamble index, and the network device generally transmits the information to the user equipment through a physical downlink control channel (Physical Downlink Control Channel, PDCCH) or radio resource control (Radio Resource Control, RRC) signaling.

In a new radio (New Radio, NR) system, multiple physical random access channel transmission occasions (PRACH transmission occasion, which also may be referred to as PRACH occasion) in a manner of frequency division multiplex (Frequency Division Multiplex, FDM) may be configured by a network device at a time instance (time instance). In addition, in a PRACH resource configuration period, there may be multiple time instances. The time instance may be a duration needed for transmitting a PRACH resource, or it may be referred to as a time domain resource position used to transmit a PRACH resource. For ease of description, the PRACH transmission occasion is abbreviated as RO.

In addition, in the NR, there may be an association relationship between an RO resource and a synchronization signal block (Synchronization signal block, SSB, which may also be referred to as Synchronization signal/Physical broadcast signal block, SS/PBCH block), for example, an RO resource may be associated with multiple SSBs such as {⅛, ¼, ½, 1, 2, 4, 8, 16} SSBs. For a contention free random access procedure, the RO resource may have an association relationship with a channel state information-reference signal (Channel State Information-Reference Signals, CSI-RS). Moreover, in a case that the total number of configured RO resources in a PRACH resource configuration period is greater than or equal to the number of RO resources needed for completing SSB-RO (or CSI-RS-RO) mapping for two times, the SSB-RO (or CSI-RS-RO) mapping may be repeated on these RO resources. To facilitate understanding, the SSB or CSI-RS associated with the RO resource is referred to as an associated object of the RO resource herein.

At present, in a PRACH resource configuration period, a relatively large number of bits need to be used by the network device so as to clearly indicate each RO resource. For example, in a format of frequency division duplex (Frequency Division Duplex, FDD) in FR1 (Frequency Range1), if there are 140 time instances in a PRACH resource configuration period, and there are 8 RO resources at each time instance correspondingly, then 13 bits are needed to indicate 140*8 RO resources, 3 bits are needed to indicate serial numbers of the RO resources, and 8 bits are needed to indicate a PRACH mask index, so as to clearly indicate each RO resource. In a format of time division duplex(ing) (Time Division Duplex(ing), TDD) in FR2 (Frequency Range2), if there are 560 time instances in a PRACH resource configuration period, and there are 8 RO resources at each time instance correspondingly, then 13 bits are needed to indicate 560*8 RO resources, where 3 bits are used to indicate serial numbers of the RO resources, and 10 bits are needed to indicate a PRACH mask index, so as to clearly indicate each RO resource.

However, the carrying capacity of a PDCCH is limited, and enough bits may not be able to be provided to make a clear indication of each RO resource. On the other hand, in a case that the amount of RO resources needed for a complete SSB-RO (or CSI-RS-RO) mapping is relatively small and if the amount of allocated time instances is relatively large, then tens or even hundreds of repeated mappings may be performed at these time instances, which results in only a few resources available for other uplink signals. Such a configuration manner has a great influence on uplink control and data transmission, thus the possibility of this configuration is very small. If PRACH resource indication information having a dozen of bits is specially introduced for this configuration, waste of bits may be caused. Therefore, it is needed to design a manner for flexibly indicating an available PRACH resource by using a small number of bits (for example, 4 bit).

SUMMARY

Embodiments of the present disclosure provide a method and a device for configuring a contention free random access resource, to reduce bit overhead needed for indicating an RO resource of a contention free access procedure.

In a first aspect, embodiments of the present disclosure provide a method for configuring a contention free random access resource, applied to a network device, which includes:

transmitting target resource indication information to a user equipment based on a pre-defined mapping relationship;

where the target resource indication information is used to determine a physical random access channel transmission occasion (RO) resource, the target resource indication information includes at least one of: a physical random access channel (PRACH) mask index or an RO resource index, and the pre-defined mapping relationship includes a correspondence between a value range of the target resource indication information and the RO resource.

In a second aspect, embodiments of the present disclosure provide a method for configuring a contention free random access resource, applied to a user equipment, which includes:

receiving target resource indication information, where the target resource indication information is used to determine a physical random access channel transmission occasion (RO) resource, and the target resource indication information includes at least one of: a physical random access channel (PRACH) mask index or an RO resource index; and determining a target RO resource based on a value range of the target resource indication information and a pre-defined mapping relationship, where the pre-defined mapping relationship includes a correspondence between the value range of the target resource indication information and the RO resource.

In a third aspect, embodiments of the present disclosure provide a network device, which includes:

a transmitting module, configured to transmit target resource indication information to a user equipment based on a pre-defined mapping relationship;

where the target resource indication information is used to determine a physical random access channel transmission occasion (RO) resource, the target resource indication information includes at least one of: a physical random access channel (PRACH) mask index or an RO resource index, and the pre-defined mapping relationship includes a correspondence between a value range of the target resource indication information and the RO resource.

In a fourth aspect, embodiments of the present disclosure provide a user equipment, which includes:

a receiving module, configured to receive target resource indication information, where the target resource indication information is used to determine a physical random access channel transmission occasion (RO) resource, and the target resource indication information includes at least one of: a physical random access channel (PRACH) mask index or an RO resource index; and a first determining module, configured to determine a target RO resource based on a value range of the target resource indication information and a pre-defined mapping relationship, where the pre-defined mapping relationship includes a correspondence between the value range of the target resource indication information and the RO resource.

In a fifth aspect, embodiments of the present disclosure provide a network device, which includes: a memory, a processor, and a radio communication program stored in the memory and executable by the processor, where the radio communication program, when being executed by the processor, performs the steps of the method according to the first aspect.

In a sixth aspect, embodiments of the present disclosure provide a user equipment, which includes: a memory, a processor, and a radio communication program stored in the memory and executable by the processor, where the radio communication program, when being executed by the processor, performs the steps of the method according to the second aspect.

In a seventh aspect, embodiments of the present disclosure provide a computer-readable medium, having a radio communication program stored thereon, where the radio communication program, when being executed by a processor, performs the steps of the method according to the first aspect or the second aspect.

In the embodiments of the present disclosure, the network device transmits the target resource indication information to the user equipment based on the pre-defined mapping relationship; where the target resource indication information is used to determine the physical random access channel transmission occasion RO resource, the target resource indication information includes at least one of: the physical random access channel PRACH mask index and the RO resource index, and the pre-defined mapping relationship is a correspondence between the value range of the target resource indication information and the RO resource. Since indication of the RO resource can be achieved by the network device through transmitting the target resource indication information with less content to the user equipment, bit overhead needed for indicating an RO resource of a contention free access procedure can be reduced. In addition, the manner in which the physical random access channel transmission occasion (RO) resource is determined based on the correspondence between the value range of the target resource indication information and the RO resource is flexible, thus the flexibility of configuring the RO resource by the network device is improved.

BRIEF DESCRIPTION OF THE DRAWINGS

To better clarify technical solutions of embodiments of the present disclosure or the conventional technologies, drawings used in descriptions of embodiments of the present disclosure or the conventional technologies are briefly introduced hereinafter. Apparently, the described drawings merely illustrate a part of the embodiments of the present disclosure. A person ordinary skilled in the art can obtain other drawings based on these drawings without any creative efforts.

FIG. 1 is a schematic flowchart of a method for configuring a contention free random access resource according to embodiments of the present disclosure;

FIG. 2 is a schematic diagram of an association relationship between RO resources and associated objects according to embodiments of the present disclosure;

FIG. 3 is a schematic diagram of another association relationship between RO resources and associated objects according to embodiments of the present disclosure;

DETAILED DESCRIPTION

Figure 4:
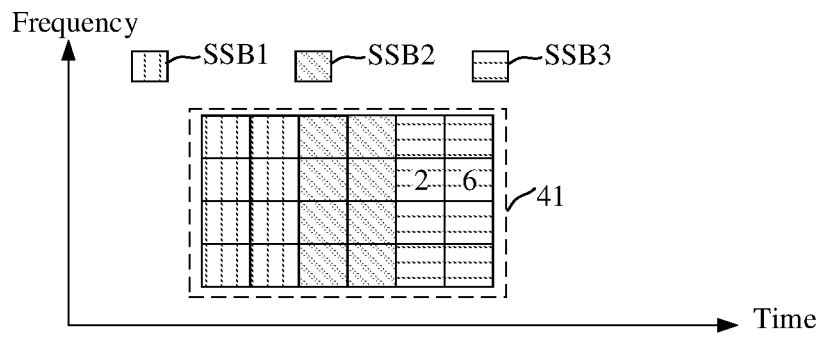
FIG. 4 is a schematic diagram of another association relationship between RO resources and associated objects according to embodiments of the present disclosure.

In order to enable those skilled in the art to better understand the technical solutions in the present disclosure, the technical solutions in embodiments of the present disclosure are described clearly in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

It should be understood that the technical solutions of the embodiments of the present disclosure may be applied to various communication systems, such as global system of mobile communication (Global System of Mobile communication, GSM) system, code division multiple access (Code Division Multiple Access, CDMA) system, wideband code division multiple access (Wideband Code Division Multiple Access, WCDMA) system, general packet radio service (General Packet Radio Service, GPRS), long term evolution (Long Term Evolution, LTE) system, LTE frequency division duplex (Frequency Division Duplex, FDD) system, LTE time division duplex (Time Division Duplex, TDD), universal mobile telecommunication system (Universal Mobile Telecommunication System, UMTS) or worldwide interoperability for microwave access (Worldwide Interoperability for Microwave Access, WiMAX) communication system, fifth generation (5-th Generation, 5G) mobile communication system, or new radio (New Radio, NR) system.

User equipment (User Equipment, UE), also known as mobile terminal (Mobile Terminal), mobile user equipment, etc., may communicate with at least one core network via a radio access network (for example, Radio Access Network, RAN). The user equipment may be a mobile terminal such as a mobile phone (or referred to as cellular phone), and may be a computer with a mobile terminal, such as a portable, pocket-sized, handheld, computer-built-in or vehicle-mounted mobile device, which exchanges language and/or data with a radio access network.

A network device is a device deployed in a radio access network to provide, for a user equipment, a function of contention free random access resource configuration. The network device may be a base station, and the base station may be a base station (Base Transceiver Station, BTS) in GSM or CDMA, or it may be a base station (NodeB) in WCDMA, or it may be an evolutional base station (evolutional Node B, eNB or e-NodeB) in LTE or a base station (gNB) in 5G.

It should be noted that when describing specific embodiments, sizes of sequence numbers in each process do not represent the execution order. The execution order of each process needs to be determined based on its function and internal logic, and should not constitute any limitation of the process of the embodiments of the present disclosure.

A method for configuring a contention free random access resource, applied to a network device, is described hereinafter with reference to FIGS. 1 to 4.

FIG. 1 shows a method for configuring a contention free random access resource according to an embodiment of the present application, which is applied to a network device. As shown in FIG. 1, the method may include the following steps.

Step 101 includes: transmitting target resource indication information to a user equipment based on a pre-defined mapping relationship; where the target resource indication information is used to determine a physical random access channel transmission occasion (PRACH transmission occasion, RO) resource, the target resource indication information includes at least one of: a physical random access channel (PRACH) mask index (mask index) or an RO resource index (RO index), and the pre-defined mapping relationship includes a correspondence between a value range of the target resource indication information and the RO resource.

The pre-defined mapping relationship may be predetermined by the network device or specified by a protocol, and the pre-defined mapping relationship is related to an RO resource group. In an example, the pre-defined mapping relationship may specifically be determined by the network device based on an RO resource group. In another example, the preset relationship may be determined by the network device based on the combination of an RO resource group and other reference factors, where other reference factors may include: frequency range (such as FR1 or FR2), format (such as FDD or TDD), etc.

The target resource indication information may be indication information of the RO resource, which needs to be transmitted by the network device to the user equipment.

For the value range of the target resource indication information, for example: when the target resource indication information only includes the PRACH mask index, the value range of the target resource indication information may specifically be PRACH mask index numbers; when the target resource indication information includes only the RO resource index, the value range of the target resource indication information may specifically be RO resource index numbers; when the target resource indication information includes both the PRACH mask index and the RO resource index, the value range of the target resource indication information may specifically be a two-tuple formed by the PRACH mask index numbers and the RO resource index numbers.

It can be understood that the number of the PRACH mask index or the RO resource index included in the target resource indication information may be one or more.

The RO resource group may be specifically obtained by grouping, based on a preset parameter, configured RO resources within a preset time interval; where the preset parameter includes one of: identifiers of the RO resources, time positions of the RO resources, frequency domain positions of the RO resources, a type of an associated object of the RO resources, or an association group, the type of the associated object includes a synchronization signal block (SSB) or a channel state information-reference signal (CSI-RS), and the association group is a set of RO resources needed for a complete mapping between RO resources and associated objects.

The preset time interval may be a configuration period for the network device to configure RO resource. Since the RO resources is are PRACH resources, the configuration period of the RO resources may be understood as a configuration period for the network device to configure the PRACH resources. Or, the preset time interval may be a synchronization period. The synchronization period is the shortest time needed for a complete mapping between RO and associated object. Generally, the shortest time is 1 times, 2 times, or 4 times the configuration period.

A case where grouping of configured RO resources within a preset time interval is performed based on each preset parameter is illustrated hereinafter with detailed examples.

In an example where grouping of the RO resources is performed based on identifiers of the RO resources, the identifier of the RO resource may be understood as an identifier of each RO resource configured by the network device within the preset time interval, and the identifiers of different RO resources are different. In this way, in a case that the preset parameter is the identifiers of the RO resources, the number of the RO resource group is equal to the number of the configured RO resources within the preset time interval. For example, it is assumed that the network device configures 10 RO resources in a PRACH configuration period, then there are correspondingly 10 different RO resource identifiers, the RO resources are divided into 10 groups, and each group contains one RO resource.

In an example where grouping of the RO resources is performed based on time positions of the RO resources, the time position may be understood as a time domain occasion or a time instance (time instance), and specifically RO resources with the same time position may be grouped into the same group. For example, RO resources that are all located in symbol (symbol) n to the symbol n+N are grouped into the same group, where N is the number of symbols occupied by a RO resource in the currently configured preamble format (format).

In an example where grouping of the RO resources is performed based on frequency domain positions of the RO resources, the frequency domain position may be a frequency range or a specific frequency, and specifically, RO resources with the same frequency domain position may be grouped into the same group.

In order to more clearly understand the example of grouping the RO resources based on a type of an associated object of the RO resources, association between RO resource and associated object is described hereinafter by taking a case where the associated object is an SSB as an example. In the NR, there may be an association relationship between the RO resource and the SSB actually transmitted by the network device, and the RO resource may be associated with multiple SSBs. Specifically, the number of SSBs that may be associated with an RO resource may be: {1/8, 1/4, 1/2, 1, 2, 4, 8, 16}. For example, as shown in FIG. 2, it is assumed that an RO resource is associated with 1/8 SSB, there are 4 RO resources performing FDM at a time instance, there are 3 SSBs in total, and the 3 SSBs are numbered 1-3, which are specifically expressed as: SSB1, SSB2, and SSB3 (which may be numbered 0-2 in practical applications, and specifically expressed as: SSB0, SSB1, and SSB2). In FIG. 2, T represents a PRACH resource configuration period, one grid represents one RO resource, grids with different filling patterns represent RO resources associated with different SSBs, the number of rows of the grids represents the number of RO resources at a time instance, and the number of columns of the grids represents the number of time instances. The number of SSBs actually transmitted by the network device is less than or equal to the number of SSBs that the network device can transmit.

On this basis, in an example where grouping of the RO resources is performed based on a type of an associated object of the RO resources, RO resources with the same type of associated object may be grouped into the same group, and the associated object associated with each RO resource in the same group may be one associated object or may be more associated objects. For example, RO resources each of which is associated with one SSB and associated with SSB1 are grouped into the same group; for another example, RO resources each of which is associated with two SSBs and associated with both SSB2 and SSB3 are grouped into the same group, and so on.

In order to facilitate understanding of the example where grouping of the RO resources are performed based on the association group, association group is described hereinafter by taking a case where the associated object is an SSB as an example. As mentioned above, the association group is a set of RO resources required for a complete mapping between RO resources and associated objects. Specifically, in a case that the total number of RO resources configured by the network device in a PRACH resource configuration period is greater than or equal to the number of RO resources needed for complete SSB-RO (or CSI-RS-RO) mapping for two times, the SSB-RO (or CSI-RS-RO) mapping may be repeated on these configured RO resources.

As shown in FIG. 3, it is assumed that an RO resource is associated with 1/8 SSBs, there are 3 SSBs in total, and the 3 SSBs are numbered 1-3, which respectively correspond to SSB1, SSB2, and SSB3 in FIG. 3, then 8*3=24 RO resources are needed for a complete SSB-RO mapping. There are 12 time instances in a PRACH resource configuration period T, and there are 4 RO resources performing FDM at a time instance, so there are a total of 12*4=48 RO resources in the PRACH resource configuration period T, and then the complete SSB-RO mapping may be repeated twice in the PRACH resource configuration period.

For another example, in a case that the total number of configured RO resources in a PRACH resource configuration period T is 72, then the complete SSB-RO mapping may be repeated for three times in the configuration period. In a case that the total number of configured RO resources in the PRACH resource configuration period T is more, then then complete SSB-RO mapping may be repeated for more times, and so on.

On this basis, in the example where grouping of the RO resources is performed based on the association group, RO resources with the same association group may be grouped into the same group.

In order to distinguish the meanings of the RO resource index and the identifier of the RO resource mentioned above, the meaning of the RO resource index is explained hereinafter with reference to FIG. 4. For the meaning of the identifier of the RO resource, reference can be made to the above description.

As described in the background of the present disclosure, in the LTE, or a contention free random access procedure, a network device usually transmits, to a user equipment through a PSCCH or RRC, information carrying a preamble index (preamble index) and a PRACH mask index (mask index), to instruct the user equipment to transmit, on a PRACH resource indicated by the PRACH mask index, a preamble (preamble) corresponding to the preamble index. Moreover, in the NR, it is allowed to carry a 3-bit RO index and a 6-bit SSB index in a PDCCH that triggers a contention free random access procedure. SSB index is index of SSB, and RO index is RO resource index associated with the SSB index. For example, it is assumed that there are 3 SSBs and each SSB is associated with 8 RO resources, then, in a case that SSB index=3 and RO index=2, RO2 associated with SSB3 is represented.

Referring to FIG. 4, there are two understandings about RO2. One refers to the RO whose frequency domain serial number is 2 among RO resources in FDM manner at the current time instance, such as the grid where the number 2 or 6 is located in FIG. 4; the other refers to the RO whose index number is 2 among RO resources associated with SSB3 in the current SSB-RO mapping, such as the grid where the number 2 is located in FIG. 4.

Exemplarily, the pre-defined mapping relationship in step 101 may include, but is not limited to, one or more of the following 14 correspondence relationships.

(1) In a case that the value range of the target resource indication information is in a first preset interval, the corresponding RO resource includes: all configured RO resources within a preset time interval.

(2) In a case that the value range of the target resource indication information is in a second preset interval, the corresponding RO resource includes: an RO resource associated with a preset associated object, in an odd-numbered RO resource group.

For example, in a case that grouping of the RO resources is performed based on the association group, and if the value of the PRACH mask index in the target resource indication information is 1, then the corresponding RO resource includes: an RO resource associated with a preset associated object, in each odd-numbered association group. Descriptions of the preset associated object will be provided in the following, which is not described herein.

(3) In a case that the value range of the target resource indication information is in a third preset interval, the corresponding RO resource includes: an RO resource associated with a preset associated object, in an even-numbered RO resource group.

For example, in a case that grouping of the RO resources is performed based on the association group, and if the value of the PRACH mask index in the target resource indication information is 2, then the corresponding RO resource includes: an RO resource associated with a preset associated object, in each even-numbered association group.

(4) In a case that the value range of the target resource indication information is in a fourth preset interval, the corresponding RO resource includes: an RO resource that is associated with a preset associated object and has an odd index number, in an odd-numbered RO resource group; and an RO resource that is associated with a preset associated object and has an even index number, in an even-numbered RO resource group.

For example, in a case that grouping of the RO resources is performed based on the association group, and if the value of the PRACH mask index in the target resource indication information is 3, then the corresponding RO resource includes: an RO resource having an odd index number among RO resources associated with a preset associated object, in an odd-numbered association group; and an RO resource having an even index number among RO resources associated with a preset associated object, in an even-numbered association group.

(5) In a case that the value range of the target resource indication information is in a fifth preset interval, the corresponding RO resource includes: all RO resources associated with a preset associated object, in an $i^{th}$ subgroup of all RO resource groups, where i is determined according to a value of the target resource indication information, subgroups are obtained by equally dividing all the RO resource groups in sequence, and i is an integer greater than zero and less than or equal to the total number of the subgroups.

For example, in a case that grouping of the RO resources is performed based on the association group: if the value of the PRACH mask index in the target resource indication information is 1, the corresponding RO resource includes an RO resource associated with a preset associated object, in the first half of association group; or, if the value of the PRACH mask index in the target resource indication information is 2, the corresponding RO resource includes an RO resource associated with a preset associated object, in the last half of association group. That is, all RO resource groups are equally divided into two subgroups in sequence (i may be {1,2}), the subgroup may be referred to as a ½ subgroup, the first half of association group is the first (i=1) ½ subgroup, and the second half of association group is the second (i=2) ½ subgroup.

For another example, in a case that all RO resource groups are equally divided into four subgroups in sequence (i may be {1,2,3,4}), the subgroup may be called ¼ subgroup, and there are a first (i=1) ¼ subgroup, a second (i=2) ¼ subgroup, a third (i=3) ¼ subgroup and a fourth (i=4) ¼ subgroup. In this case, if the value of the PRACH mask index in the target resource indication information is 1, the corresponding RO resource includes an RO resource associated with a preset associated object, in the first quarter of association group; or, if the value of the PRACH mask index in the target resource indication information is 2, the corresponding RO resource includes an RO resource associated with a preset associated object, in the second quarter of association group.

(6) In a case that the value range of the target resource indication information is in a sixth preset interval, the corresponding RO resource includes: RO resources in a $j^{th}$ subgroup among all RO resources associated with a preset associated object, from all RO resource groups, where j is determined according to a value of the target resource indication information, subgroups are obtained by equally dividing all the RO resources associated with the preset associated object in sequence, and j is an integer greater than zero and less than or equal to the total number of the subgroups.

For example, all RO resources associated with a preset associated object are equally divided into two subgroups in sequence (j may be {1,2}), the subgroup may be called ½ subgroup, the first half of each association group is the first (i=1) ½ subgroup, and the second half of each association group is the second (i=2) ½ subgroup.

For another example, in a case that all the RO resources associated with a preset associated object are equally divided into four subgroups in sequence (j may be {1,2,3,4}), the subgroup may be called ¼ subgroup, then the first quarter of each association group is the first (i=1) ¼ subgroup, the second quarter of each association group is the second (i=2) ¼ subgroup, the third quarter of each association group is the third (i=3) ¼ subgroup, and the last quarter of each association group is the fourth (i=4) ¼ subgroup.

(7) In a case that the value range of the target resource indication information is in a seventh preset interval, the corresponding RO resource includes: RO resources associated with a preset associated object, in a preset number of consecutive RO resource groups starting from a RO resource group having a preset serial number.

For example, in a case that grouping of the RO resources is performed based on the association group, and if the value of the PRACH mask index in the target resource indication information is 7, the corresponding RO resources may include: RO resources associated with a preset associated object, in Y consecutive groups starting from an $X^{th}$ association group.

(8) In a case that the value range of the target resource indication information is in an eighth preset interval, the corresponding RO resource includes: all RO resources associated with a preset associated object, in a RO resource group having a preset serial number, where the preset serial number is determined according to a value of the target resource indication information.

For example, in the case that grouping of the RO resources is performed based on the association group, and if the value of the PRACH mask index in the target resource indication information is 8, the corresponding RO resource may include: all RO resources associated with a preset associated object, in the 9th RO resource group.

(9) In a case that the value range of the target resource indication information is in a ninth preset interval, the corresponding RO resource includes: an RO resource that is associated with a preset associated object and has a preset index number, in all RO resource groups.

The preset index number may be determined based on a value of a specified bit of the PRACH mask index and a value indicated by the remaining bits of the PRACH mask index.

For example, in the case that grouping of the RO resources is performed based on the association group, it is assumed that the specified bit is the most significant bit, and if the value of the PRACH mask index in the target resource indication information is 9, the corresponding binary number is 111, the value of the most significant bit of the PRACH mask index is 1, and the value indicated by the remaining bits is 3. Then the value indicated by the remaining bits may be determined as the preset index number, and the corresponding RO resource may include: an RO resource that is associated with a preset associated object and has a preset index number of 3 (i.e., RO 3), in all RO resource groups.

(10) In a case that the value range of the target resource indication information is in a tenth preset interval, the corresponding RO resource includes: an RO resource that is associated with a preset associated object and has a preset index number, in an odd-number RO resource group.

The method for determining the preset index number may be similar to that in the ninth correspondence relationship, which is not described hereinafter.

(11) In a case that the value range of the target resource indication information is in an eleventh preset interval, the corresponding RO resource includes: an RO resource that is associated with a preset associated object and has a preset index number, in an even-number RO resource group.

(12) In a case that the value range of the target resource indication information is in a twelfth preset interval, the corresponding RO resource includes: an RO resource that is associated with a preset associated object and has a preset index number, in a $k^{th}$ subgroup of all RO resource groups, where k is determined according to a value of the target resource indication information, subgroups are obtained by equally dividing all resource groups in sequence, and k is an integer greater than zero and less than or equal to the total number of the subgroups.

In this correspondence relationship, division of subgroups and determination of the value of k are similar to those in item (5), which is not repeated herein.

(13) In a case that the value range of the target resource indication information is in a thirteenth preset interval, the corresponding RO resource includes: an RO resource that is associated with a preset associated object and has a preset index number, in an RO resource group having a preset serial number, where the preset serial number is determined according to a value of the target resource indication information.

(14) In a case that the value range of the target resource indication information is in a fourteenth preset interval, the corresponding RO resource includes: an RO resource that is associated with a preset associated object and has a preset index number, in a preset number of consecutive RO resource groups starting from a RO resource group having a preset serial number.

It should be noted that the above 14 correspondences are not an exhaustive list of correspondences included in the pre-defined mapping relationship. Those skilled in the art can extend more correspondences, or extend more meanings represented by different values of the target resource indication information, based on the technical ideas of the embodiments of the present disclosure.

It should also be noted that the value included in the first preset interval to the fourteenth preset interval may be one value or may be more values.

It can be understood that, it is assumed that the number of correspondences between the value range of the target resource indication information and the RO resource determined in actual applications is not more than 16, then the network device can realize the indication of the RO resource by using 4 bits, thereby reducing bit overhead needed for indicating a PRACH resource of a contention free access procedure.

In specific implementations, the step 101 may specifically include: transmitting the target resource indication information to the user equipment through a physical downlink control channel (PDCCH) or radio resource control (RRC).

On this basis, in an example, in a case that the PDCCH or the RRC further carries one or more associated object index numbers, the preset associated object in the above 14 correspondence relationships may be associated object(s) corresponding to the one or more associated object index numbers.

For example, it is assumed that the PDCCH or RRC further carries SSB indication information, the SSB indication information includes one or a group of SSBs associated with RO resources, and the one or the group of SSBs indicated in the SSB indication information may be recorded as a SSB list (ssb-ResourceList) in the embodiments of the present disclosure. In this way, the preset associated object in the above 14 correspondence relationships may be an associated object in the SSB list.

In another example, the preset associated object in the 14 correspondence relationships may include multiple associated objects transmitted by the network device (which may be actually transmitted by the network device). The multiple associated objects may be all associated objects transmitted by the network device, or may be part of associated objects transmitted by the network device. In this example, there may be two situations. One situation is that the PDCCH or the RRC does not carry the associated object index numbers, and the multiple associated objects actually transmitted by the network device may be directly used as the preset associated object; the other situation is that the PDCCH or the RRC carries the associated object index numbers, but the carried associated object index numbers are invalid, then the multiple associated objects actually transmitted by the network device are used as the preset associated object.

In addition, as described above, in a case that the target resource indication information includes the PRACH mask index and does not include the RO resource index, the preset index number in the above 14 correspondence relationships may be determined based on the value of the specified bit of the PRACH mask index and the value indicated by the remaining bits. The preset index number described in 14 correspondences. The specified bit may be any one or more bits of the PRACH mask index, such as the most significant bit, or, the least significant bit, or, the most significant bit and a bit next to the most significant bit.

Specifically, when that the specified bit is the most significant bit: in a case that the most significant bit of the PRACH mask index is a first preset value, the preset index number is the value indicated by the remaining bits of the PRACH mask index; and in a case that the most significant bit of the PRACH mask index is a second preset value, the preset index number is a value other than the value indicated by the remaining bits of the PRACH mask index; and the first preset value and the second preset value are different.

For example, in a case that the most significant bit of the PRACH mask index indicates 0 (the first preset value=0), and the value of the other bits of the PRACH mask index except the most significant bit is N, then the preset index number of the RO resource may be N. In addition, the PRACH mask index combined with the SSB index represents an RO resource whose index number is N among RO resources associated with the associated objects in the SSB list. In a case that the most significant bit of the PRACH mask index indicates 1 (the second preset value=1), and the value of the other bits of the PRACH mask index except the most significant bit is N, then the PRACH mask index does not indicate an RO resource whose index number is N among RO resources, and indicates other RO resources.

Furthermore, in embodiments of the present disclosure, the configured RO resources within the preset time interval may include: any RO resources among all configured RO resources within the preset time interval, or valid RO resources among all configured RO resources within the preset time interval.

In different application scenarios, valid RO resources have different meanings. For FR1, RO resources are generally transmitted in the uplink part of the semi-static DL/UL configuration configured by remaining minimum system information (Remaining Minimum System Information, RMSI), and it is generally considered that the RO resources may not conflict with downlink transmission, that is, it is generally considered that RO resources under FR1 are all valid. For FR2, RO resources are generally transmitted in the uplink part and flexible part of the semi-static DL/UL configuration configured by RMSI; and in a random access channel (Random Access Channel, RACH) slot, valid RO resources may not conflict with SSB and may not appear in front of SSB, and the user equipment does not expect to receive downlink signals on any valid RO, that is, it is generally considered that RO resources, which may not conflict with SSB and may not appear in front of SSB and on which downlink signals may not be received, are valid.

According to the method for configuring the contention free random access resource provided by the embodiments of the present disclosure, since indication of the RO resource can be achieved by the network device through transmitting the target resource indication information with less content to the user equipment, bit overhead needed for indicating an RO resource of a contention free access procedure can be reduced. In addition, the manner in which the physical random access channel transmission occasion (RO) resource is determined based on the correspondence between the value range of the target resource indication information and the RO resource is flexible, thus the flexibility of configuring the RO resource by the network device is improved.

General descriptions of the method for configuring the contention free random access resource, which is applied to the network device, are provided in the above. The pre-defined mapping relationship is described hereinafter with specific examples.

In a first example, pieces of target resource indication information are respectively designed for different frequency ranges (FR1 or FR2) and different formats (FFD or TDD) (that is, design is performed according to the frequency range and the format), the target resource indication information includes: the PRACH mask index and the RO resource index, grouping of RO resources is performed based on an association group, and the target resource indication information is transmitted to the user equipment through a PDCCH or RRC.

It is assumed that the PDCCH or RRC also carries SSB indication information, the SSB indication information includes one or more SSBs associated with RO resources (for example, the SSB indication information indicates an SSB associated with RO resources, or the SSB indication information indicates a group of SSBs associated with RO resources), and the one or more SSBs are recorded as a SSB list (ssb-ResourceList). It is assumed that the value of the RO resource index is N, and an RO resource whose index number is N among RO resources associated with SSBM is recorded as RO N. It is also assumed that under FDD&FR1, TDD&FR1 and TDD&FR2, the quantities of association groups configured by the base station in a PRACH resource configuration period do not exceed N1, N2, and N3, respectively, where N1>N3>N2.

On this basis, the pre-defined mapping relationship as shown in Table 1 may be determined.

TABLE 1

Example 1 of pre-defined mapping relationship

| PRACH mask index | For FDD FR1, available PRACH resources (Allowed PRACH) | For TDD FR1, available PRACH resources (Allowed PRACH) | For TDD FR2, available PRACH resources (Allowed PRACH) |
|---|---|---|---|
| 0 | All RO | | |
| 1 | RO N associated with associated object(s) in the SSB list, in all association groups | | |
| 2 | RO N associated with associated object(s) in the SSB list, in each odd-numbered association group | | |
| 3 | RO N associated with associated object(s) in the SSB list, in each even-numbered association group | | |
| 4 | RO N associated with associated object(s) in the SSB list, in the first half of the association group | | |
| 5 | RO N associated with associated object(s) in the SSB list, in the last half of the association group | | |
| 6 | RO N associated with associated object(s) in the SSB list, in the first association group | | |
| 7 | RO N associated with associated object(s) in the SSB list, in the second association group | | |
| ... | ... | | |
| N2 + 5 | RO N associated with associated object(s) in the SSB list, in the $N2^{th}$ association group | | |
| N2 + 6 | RO N associated with associated object(s) in the SSB list, in the $(N2 + 1)^{th}$ association group | Reserved | RO N associated with associated object(s) in the SSB list, in the $(N2 + 1)^{th}$ association group |
| ... | ... | | |
| N3 + 5 | RO N associated with associated object(s) in the SSB list, in the $N3^{th}$ association group | Reserved | RO N associated with associated object(s) in the SSB list, in the $N3^{th}$ association group |
| N3 + 6 | RO N associated with associated object(s) in the SSB list, in the $(N3 + 1)^{th}$ association group | Reserved | Reserved |
| ... | ... | | |
| N1 + 5 | RO N associated with associated object(s) in the SSB list, in the $N1^{th}$ association group | Reserved | Reserved |

In a second example, the same target resource indication information is designed for different frequency ranges (FR1 or FR2) and different formats (FFD or TDD) (that is, design is performed uniformly regardless of frequency range and format), the target resource indication information includes: the PRACH mask index and the RO resource index, grouping of RO resources is performed based on an association group, and the target resource indication information is transmitted to the user equipment through a PDCCH or RRC.

It is assumed that the PDCCH or RRC also carries SSB indication information, the SSB indication information includes one or more SSBs associated with RO resources (for example, the SSB indication information indicates an SSB associated with RO resources, or the SSB indication information indicates a group of SSBs associated with RO resources), and the one or more SSBs are recorded as a SSB list (ssb-ResourceList). It is assumed that the value of the RO resource index is N, and an RO resource whose index number is N among RO resources associated with SSBM is recorded as RO N. It is also assumed that the number of association groups configured by the base station in a PRACH resource configuration period does not exceed X.

On this basis, the pre-defined mapping relationship as shown in Table 2 may be determined.

TABLE 2

Example 2 of pre-defined mapping relationship

| PRACH mask index | Available PRACH resources (Allowed PRACH) |
|---|---|
| 0 | All RO |
| 1 | RO N associated with associated object(s) in the SSB list, in all association groups |
| 2 | RO N associated with associated object(s) in the SSB list, in each odd-numbered association group |
| 3 | RO N associated with associated object(s) in the SSB list, in each even-numbered association group |
| 4 | RO N associated with associated object(s) in the SSB list, in the first half of the association group |
| 5 | RO N associated with associated object(s) in the SSB list, in the last half of the association group |
| 6 | RO N associated with associated object(s) in the SSB list, in the first association group |
| 7 | RO N associated with associated object(s) in the SSB list, in the second association group |
| ... | ... |
| X + 5 | RO N associated with associated object(s) in the SSB list, in the $X^{th}$ association group |

In a third example, the same target resource indication information is designed for different frequency ranges (FR1 or FR2) and different formats (FFD or TDD) (that is, design is performed uniformly regardless of frequency range and format), the target resource indication information only includes the PRACH mask index and does not include the RO resource index, grouping of RO resources is performed based on an association group, the target resource indication information is transmitted to the user equipment through a PDCCH or RRC, and a value of a most significant bit of the PRACH mask index and a value indicated by the remaining bits of the PRACH mask index are used to determine the preset index number of the RO resource (the most significant bit of PRACH is used to determine the preset index number of the RO resource).

It is assumed that the PDCCH or RRC also carries SSB indication information, the SSB indication information includes one or more SSBs associated with RO resources (for example, the SSB indication information indicates an SSB associated with RO resources, or the SSB indication information indicates a group of SSBs associated with RO resources), and the one or more SSBs are recorded as a SSB list (ssb-ResourceList). In this example, SSB(s) in the SSB list may be determined as the preset associated object, or all SSBs actually transmitted by the network device may be determined as the preset associated object.

For example, in a case that the most significant bit of the PRACH mask index indicates 0 (the first preset value=0), and the value of the other bits of the PRACH mask index except the most significant bit is N, then the preset index number of the RO resource may be N. In addition, the PRACH mask index combined with the SSB index represents an RO resource whose index number is N among RO resources associated with the associated object(s) in the SSB list.

In a case that the most significant bit of the PRACH mask index indicates 1 (the second preset value=1), and the value of the other bits of the PRACH mask index except the most significant bit is N, then the PRACH mask index does not indicate an RO resource whose index number is N among RO resources, and indicates other RO resource(s).

On this basis, the pre-defined mapping relationship shown in Table 3 may be determined.

TABLE 3

Example 3 of pre-defined mapping relationship

| PRACH mask index | Available PRACH resources (Allowed PRACH) |
|---|---|
| 0 | RO associated with associated object(s) in the SSB list (or with all SSBs actually transmitted by the network device) and having an index of 0 |
| 1 | RO associated with associated object(s) in the SSB list (or with all SSBs actually transmitted by the network device) and having an index of 1 |
| 2 | RO associated with associated object(s) in the SSB list (or with all SSBs actually transmitted by the network device) and having an index of 2 |
| 3 | RO associated with associated object(s) in the SSB list (or with all SSBs actually transmitted by the network device) and having an index of 3 |
| 4 | RO associated with associated object(s) in the SSB list (or with all SSBs actually transmitted by the network device) and having an index of 4 |
| 5 | RO associated with associated object(s) in the SSB list (or with all SSBs actually transmitted by the network device) and having an index of 5 |
| 6 | RO associated with associated object(s) in the SSB list (or with all SSBs actually transmitted by the network device) and having an index of 6 |
| 7 | RO associated with associated object(s) in the SSB list (or with all SSBs actually transmitted by the network device) and having an index of 7 |
| 8 | RO associated with associated object(s) in the SSB list (or with all SSBs actually transmitted by the network device) and having an odd index, in an odd-numbered group; and RO associated with associated object(s) in the SSB list (or with all SSBs actually transmitted by the network device) and having an even index, in an even-numbered group |
| 9 | RO associated with associated object(s) in the SSB list (or with all SSBs actually transmitted by the network device), in C consecutive association groups starting from the $S^{th}$ association group |
| 10 | RO associated with associated object(s) in the SSB list (or with all SSBs actually transmitted by the network device), in the odd-numbered group |
| 11 | RO associated with associated object(s) in the SSB list (or with all SSBs actually transmitted by the network device), in the even-numbered group |
| 12 | RO associated with associated object(s) in the SSB list (or with all SSBs actually transmitted by the network device), in the first half of the association group |
| 13 | RO associated with associated object(s) in the SSB list (or with all SSBs actually transmitted by the network device), in the last half of the association group |
| 14 | RO associated with associated object(s) in the SSB list (or with all SSBs actually transmitted by the network device), in a certain group |
| 15 | All RO |

In a fourth example, the same target resource indication information is designed for different frequency ranges (FR1 or FR2) and different formats (FFD or TDD) (that is, design is performed uniformly regardless of frequency range and format), the target resource indication information only includes the PRACH mask index and does not include the RO resource index, grouping of RO resources is performed based on an association group, the target resource indication information is transmitted to the user equipment through a PDCCH or RRC, and the most significant bit of PRACH is not used to determine the preset index number of the RO resource.

It is assumed that the PDCCH or RRC also carries SSB indication information, the SSB indication information includes one or more SSBs associated with RO resources (for example, the SSB indication information indicates an SSB associated with RO resources, or the SSB indication information indicates a group of SSBs associated with RO resources), and the one or more SSBs are recorded as a SSB list (ssb-ResourceList). In this example, SSB(s) in the SSB list may be determined as the preset associated object, or all SSBs actually transmitted by the network device may be determined as the preset associated object.

On this basis, the pre-defined mapping relationship as shown in Table 3 may be determined.

In a fifth example, pieces of target resource indication information are respectively designed for different frequency ranges (FR1 or FR2) and different formats (FFD or TDD) (that is, design is performed according to the frequency range and the format), the target resource indication information only includes the PRACH mask index and does not include the RO resource index, grouping of RO resources is performed based on an association group, and the target resource indication information is transmitted to the user equipment through a PDCCH or RRC.

It is assumed that the PDCCH or RRC also carries SSB indication information, the SSB indication information includes one or more SSBs associated with RO resources (for example, the SSB indication information indicates an SSB associated with RO resources, or the SSB indication information indicates a group of SSBs associated with RO resources), and the one or more SSBs are recorded as a SSB list (ssb-ResourceList). It is also assumed that under FDD&FR1, TDD&FR1 and TDD&FR2, the quantities of association groups configured by the base station in a PRACH resource configuration period do not exceed N1, N2, and N3, respectively, where N1>N3>N2.

On this basis, the pre-defined mapping relationship as shown in Table 4 may be determined.

TABLE 4

Example 4 of pre-defined mapping relationship

| PRACH mask index | For FDD FR1, available PRACH resources (Allowed PRACH) | For TDD FR1, available PRACH resources (Allowed PRACH) | For TDD FR2, available PRACH resources (Allowed PRACH) |
| --- | --- | --- | --- |
| 0 | All RO | | |
| 1 | RO associated with associated object(s) in the SSB list, in all association groups | | |
| 2 | RO associated with associated object(s) in the SSB list, in each odd-numbered association group | | |
| 3 | RO associated with associated object(s) in the SSB list, in each even-numbered association group | | |
| 4 | RO associated with associated object(s) in the SSB list, in the first half of the association group | | |
| 5 | RO associated with associated object(s) in the SSB list, in the last half of the association group | | |
| 6 | RO associated with associated object(s) in the SSB list, in the first association group | | |
| 7 | RO associated with associated object(s) in the SSB list, in the second association group | | |
| ... | ... | | |
| N2 + 5 | RO associated with associated object(s) in the SSB list, in the $N2^{th}$ association group | | |
| N2 + 6 | RO associated with associated object(s) in the SSB list, in the $(N2 + 1)^{th}$ association group | Reserved | RO associated with associated object(s) in the SSB list, in the $(N2 + 1)^{th}$ association group |
| ... | | ... | |
| N3 + 5 | RO associated with associated object(s) in the SSB list, in the $N3^{th}$ association group | Reserved | RO associated with associated object(s) in the SSB list, in the $N3^{th}$ association group |
| N3 + 6 | RO associated with associated object(s) in the SSB list, in the $(N3 + 1)^{th}$ association group | Reserved | Reserved |
| ... | | ... | |
| N1 + 5 | RO associated with associated object(s) in the SSB list, in the $N1^{th}$ association group | Reserved | Reserved |

In a sixth example, the same target resource indication information is designed for different frequency ranges (FR1 or FR2) and different formats (FFD or TDD) (that is, design is performed uniformly regardless of frequency range and format), the target resource indication information only includes the PRACH mask index and does not include the RO resource index, grouping of RO resources is performed based on an association group, and the target resource indication information is transmitted to the user equipment through a PDCCH or RRC.

It is assumed that the PDCCH or RRC also carries SSB indication information, the SSB indication information includes one or more SSBs associated with RO resources (for example, the SSB indication information indicates an SSB associated with RO resources, or the SSB indication information indicates a group of SSBs associated with RO resources), and the one or more SSBs are recorded as a SSB list (ssb-ResourceList). It is also assumed that the number of association groups configured by the base station in a PRACH resource configuration period does not exceed D.

On this basis, the pre-defined mapping relationship shown in Table 5 may be determined.

TABLE 5

Example 5 of pre-defined mapping relationship

| PRACH mask index | Available PRACH resources (Allowed PRACH) |
| --- | --- |
| 0 | All RO |
| 1 | RO associated with associated object(s) in the SSB list, in all association groups |
| 2 | RO associated with associated object(s) in the SSB list, in each odd-numbered association group |
| 3 | RO associated with associated object(s) in the SSB list, in each even-numbered association group |

TABLE 5-continued

Example 5 of pre-defined mapping relationship

| PRACH mask index | Available PRACH resources (Allowed PRACH) |
|---|---|
| 4 | RO associated with associated object(s) in the SSB list, in the first half of the association group |
| 5 | RO associated with associated object(s) in the SSB list, in the last half of the association group |
| 6 | RO associated with associated object(s) in the SSB list, in the first association group |
| 7 | RO associated with associated object(s) in the SSB list, in the second association group |
| ... | ... |
| D + 5 | RO associated with associated object(s) in the SSB list, in the $D^{th}$ association group |

In a seventh example, pieces of target resource indication information are respectively designed for different frequency ranges (FR1 or FR2) and different formats (FFD or TDD) (that is, design is performed according to the frequency range and the format), the target resource indication information includes: the PRACH mask index and the RO resource index, grouping of RO resources is performed based on time positions (time instances), and the target resource indication information is transmitted to the user equipment through a PDCCH or RRC.

It is assumed that the PDCCH or RRC also carries SSB indication information, the SSB indication information includes one or more SSBs associated with RO resources (for example, the SSB indication information indicates an SSB associated with RO resources, or the SSB indication information indicates a group of SSBs associated with RO resources), and the one or more SSBs are recorded as a SSB list (ssb-ResourceList). It is assumed that the value of the RO resource index is N, and an RO resource whose index number is N among RO resources associated with SSBM is recorded as RO N. It is also assumed that under FDD&FR1, TDD&FR1 and TDD&FR2, the quantities of time instances configured by the base station in a PRACH resource configuration period do not exceed N1, N2, and N3, respectively, where N1>N3>N2.

On this basis, the pre-defined mapping relationship as shown in Table 6 may be determined.

TABLE 6

Example 6 of pre-defined mapping relationship

| PRACH mask index | For FDD FR1, available PRACH resources (Allowed PRACH) | For TDD FR1, available PRACH resources (Allowed PRACH) | For TDD FR2, available PRACH resources (Allowed PRACH) |
|---|---|---|---|
| 0 | All RO | | |
| 1 | RO N associated with associated object(s) in the SSB list, at all time instances | | |
| 2 | RO N associated with associated object(s) in the SSB list, at each odd-numbered time instance | | |
| 3 | RO N associated with associated object(s) in the SSB list, at each even-numbered time instance | | |
| 4 | RO N associated with associated object(s) in the SSB list, at the first half of the time instance | | |
| 5 | RO N associated with associated object(s) in the SSB list, at the last half of the time instance | | |
| 6 | RO N associated with associated object(s) in the SSB list, at the first time instance | | |
| 7 | RO N associated with associated object(s) in the SSB list, at the second time instance | | |
| ... | ... | | |
| N2 + 5 | RO N associated with associated object(s) in the SSB list, at the $N2^{th}$ time instance | | |
| N2 + 6 | RO N associated with associated object(s) in the SSB list, at the $(N2 + 1)^{th}$ time instance | Reserved | RO N associated with associated object(s) in the SSB list, at the $(N2 + 1)^{th}$ time instance |
| ... | | | |
| N3 + 5 | RO N associated with associated object(s) in the SSB list, at the $N3^{th}$ time instance | Reserved | RO N associated with associated object(s) in the SSB list, at the $N3^{th}$ time instance |
| N3 + 6 | RO N associated with associated object(s) in the SSB list, at the $(N3 + 1)^{th}$ time instance | Reserved | Reserved |
| ... | | | |
| N1 + 5 | RO N associated with associated object(s) in the SSB list, at the $N1^{th}$ time instance | Reserved | Reserved |

In an eighth example, the same target resource indication information is designed for different frequency ranges (FR1 or FR2) and different formats (FFD or TDD) (that is, design is performed uniformly regardless of frequency range and format), the target resource indication information includes: the PRACH mask index and the RO resource index, grouping of RO resources is performed based on time positions (time instances), and the target resource indication information is transmitted to the user equipment through a PDCCH or RRC.

It is assumed that the PDCCH or RRC also carries SSB indication information, the SSB indication information includes one or more SSBs associated with RO resources (for example, the SSB indication information indicates an SSB associated with RO resources, or the SSB indication information indicates a group of SSBs associated with RO resources), and the one or more SSBs are recorded as a SSB list (ssb-ResourceList). It is assumed that the value of the RO resource index is N, and an RO resource whose index number is N among RO resources associated with SSBM is recorded as RO N. It is also assumed that the number of time instances configured by the base station in a PRACH resource configuration period does not exceed X.

On this basis, the pre-defined mapping relationship as shown in Table 7 may be determined.

TABLE 7

Example 7 of pre-defined mapping relationship

| PRACH mask index | Available PRACH resources (Allowed PRACH) |
|---|---|
| 0 | All RO |
| 1 | RO N associated with associated object(s) in the SSB list, at all time instances |
| 2 | RO N associated with associated object(s) in the SSB list, at each odd-numbered time instance |
| 3 | RO N associated with associated object(s) in the SSB list, at each even-numbered time instance |
| 4 | RO N associated with associated object(s) in the SSB list, at the first half of the time instance |
| 5 | RO N associated with associated object(s) in the SSB list, at the last half of the time instance |
| 6 | RO N associated with associated object(s) in the SSB list, at the first time instance |
| 7 | RO N associated with associated object(s) in the SSB list, at the second time instance |
| ... | ... |
| X + 5 | RO N associated with associated object(s) in the SSB list, at the $X^{th}$ time instance |

Detailed descriptions of the method for configuring the contention free random access resource according to the embodiments of the present disclosure are provided in the above in conjunction with FIGS. 1 to 4. A method for configuring a contention free random access resource, which is applied to a user equipment, is described hereinafter in conjunction with FIG. 5.

Figure 5:
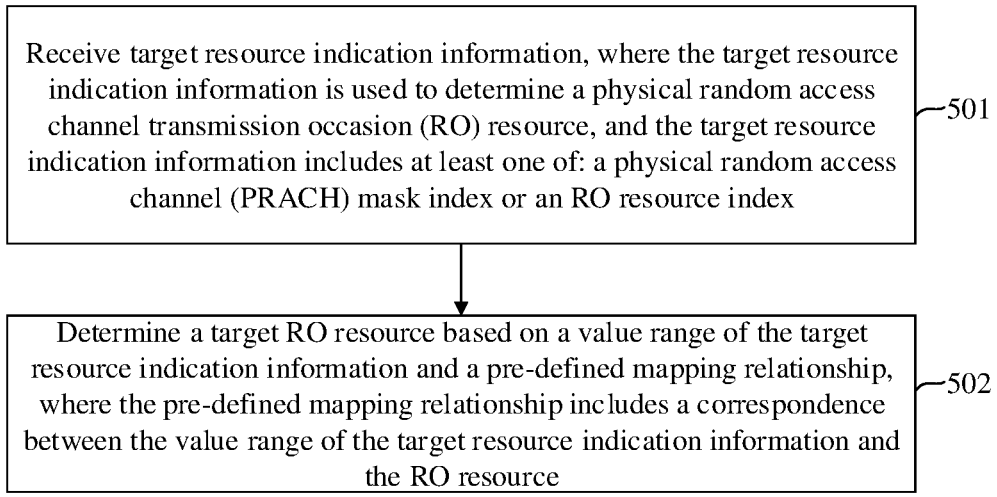
FIG. 5 is a schematic flowchart of another method for configuring a contention free random access resource according to embodiments of the present disclosure.

FIG. 5 shows a method for configuring a contention free random access resource according to an embodiment of the present application, which is applied to a user equipment. As shown in FIG. 5, the method may include the following steps.

Step 501 includes: receiving target resource indication information, where the target resource indication information is used to determine a physical random access channel transmission occasion (RO) resource, and the target resource indication information includes at least one of: a physical random access channel (PRACH) mask index or an RO resource index Step 502 includes: determining a target RO resource based on a value range of the target resource indication information and a pre-defined mapping relationship, where the pre-defined mapping relationship includes a correspondence between the value range of the target resource indication information and the RO resource.

In an example, step 502 may specifically include:

sub-step 1: determining a candidate RO resource that matches the value range of the target resource indication information based on the value range of the target resource indication information and the pre-defined mapping relationship;

sub-step 2: in a case that the number of candidate RO resource is equal to one, determining the candidate RO resource as the target RO resource;

sub-step 3: in a case that the number of candidate RO resource is greater than one, selecting, based on a first preset rule, one or more RO resources from the candidate RO resources as the target RO resource; and sub-step 4: in a case that the number of candidate RO resource is equal to zero, selecting, based on a second preset rule, one or more RO resources from configured RO resources within a preset time interval, as the target RO resource.

More specifically, sub-step 3 may include: selecting, from the candidate RO resources, one or more available RO resources closest to a current time, as the target RO resource; or, selecting, from the candidate RO resources, multiple available RO resources in a manner of frequency division multiplex (FDM) in a frequency domain, as the target RO resource; or, selecting, from the candidate RO resources, multiple available RO resources in a manner of time division multiplex (Time Division Multiplex, TDM) in a time domain, as the target RO resource.

More specifically, sub-step 4 may include: selecting, from the configured RO resources within the preset time interval, one or more available RO resources closest to a current time, as the target RO resource; or, selecting, from the configured RO resources within the preset time interval, multiple available RO resources in a manner of frequency division multiplex (FDM) in a frequency domain, as the target RO resource; or, selecting, from the configured RO resources within the preset time interval, multiple available RO resources in a manner of time division multiplex (TDM) in a time domain, as the target RO resource.

In an example, the pre-defined mapping relationship may be configured by the network device for the user equipment or specified by a protocol, and the pre-defined mapping relationship is related to an RO resource group.

The RO resource group is obtained by grouping, based on a preset parameter, configured RO resources within a preset time interval;

the preset parameter includes one of: identifiers of the RO resources, time positions of the RO resources, frequency domain positions of the RO resources, a type of an associated object of the RO resources, or an association group, the type of the associated object includes a synchronization signal block (SSB) or a channel state information-reference signal (CSI-RS), and the association group is a set of RO resources needed for a complete mapping between RO resources and associated objects; and in a case that the preset parameter is the identifiers of the RO resources, the number of the RO resource group is equal to the number of the configured RO resources within the preset time interval.

As an example, the preset time interval includes: a configuration period for configuring RO resources by the network device or a synchronization period.

The pre-defined mapping relationship includes one or more of the following relationships:

(1) in a case that the value range of the target resource indication information is in a first preset interval, the corresponding RO resource comprises: all configured RO resources within a preset time interval by the network device;

(2) in a case that the value range of the target resource indication information is in a second preset interval, the corresponding RO resource comprises: an RO resource associated with a preset associated object, in an odd-numbered RO resource group;

(3) in a case that the value range of the target resource indication information is in a third preset interval, the corresponding RO resource comprises: an RO resource associated with a preset associated object, in an even-numbered RO resource group;

(4) in a case that the value range of the target resource indication information is in a fourth preset interval, the corresponding RO resource comprises: an RO resource that is associated with a preset associated object and has an odd index number, in an odd-numbered RO resource group; and an RO resource that is associated with a preset associated object and has an even index number, in an even-numbered RO resource group;

(5) in a case that the value range of the target resource indication information is in a fifth preset interval, the corresponding RO resource comprises: all RO resources associated with a preset associated object, in an $i^{th}$ subgroup of all RO resource groups, where i is determined according to a value of the target resource indication information, subgroups are obtained by equally dividing all the RO resource groups in sequence, and i is an integer greater than zero and less than or equal to the total number of the subgroups;

(6) in a case that the value range of the target resource indication information is in a sixth preset interval, the corresponding RO resource comprises: RO resources in a $j^{th}$ subgroup among all RO resources associated with a preset associated object, from all RO resource groups, where j is determined according to a value of the target resource indication information, subgroups are obtained by equally dividing all the RO resources associated with the preset associated object in sequence, and j is an integer greater than zero and less than or equal to the total number of the subgroups;

(7) in a case that the value range of the target resource indication information is in a seventh preset interval, the corresponding RO resource comprises: RO resources associated with a preset associated object, in a preset number of consecutive RO resource groups starting from a RO resource group having a preset serial number;

(8) in a case that the value range of the target resource indication information is in an eighth preset interval, the corresponding RO resource comprises: all RO resources associated with a preset associated object, in a RO resource group having a preset serial number, where the preset serial number is determined according to a value of the target resource indication information;

(9) in a case that the value range of the target resource indication information is in a ninth preset interval, the corresponding RO resource comprises: an RO resource that is associated with a preset associated object and has a preset index number, in all RO resource groups;

(10) in a case that the value range of the target resource indication information is in a tenth preset interval, the corresponding RO resource comprises: an RO resource that is associated with a preset associated object and has a preset index number, in an odd-number RO resource group;

(11) in a case that the value range of the target resource indication information is in an eleventh preset interval, the corresponding RO resource comprises: an RO resource that is associated with a preset associated object and has a preset index number, in an even-number RO resource group;

(12) in a case that the value range of the target resource indication information is in a twelfth preset interval, the corresponding RO resource comprises: an RO resource that is associated with a preset associated object and has a preset index number, in a $k^{th}$ subgroup of all RO resource groups, where k is determined according to a value of the target resource indication information, subgroups are obtained by equally dividing all resource groups in sequence, and k is an integer greater than zero and less than or equal to the total number of the subgroups;

(13) in a case that the value range of the target resource indication information is in a thirteenth preset interval, the corresponding RO resource comprises: an RO resource that is associated with a preset associated object and has a preset index number, in an RO resource group having a preset serial number, where the preset serial number is determined according to a value of the target resource indication information; or,

(14) in a case that the value range of the target resource indication information is in a fourteenth preset interval, the corresponding RO resource comprises: an RO resource that is associated with a preset associated object and has a preset index number, in a preset number of consecutive RO resource groups starting from a RO resource group having a preset serial number.

Optionally, step 501 may specifically include: receiving the target resource indication information carried in a physical downlink control channel (PDCCH) or radio resource control (RRC).

On this basis, in an example, in a case that the PDCCH or the RRC further carries one or more associated object index numbers, the method shown in FIG. 5 may further include:

determining, associated object(s) corresponding to the one or more associated object index numbers, as the preset associated object.

In another example, the method shown in FIG. 5 may further include: determining, multiple associated objects transmitted by the network device, as the preset associated object.

In another example, the method shown in FIG. 5 may further include: determining the preset index number based on a value of a specified bit of the PRACH mask index and a value indicated by remaining bits of the PRACH mask index.

More specifically, when the specified bit is a most significant bit, in a case that the most significant bit of the PRACH mask index is a first preset value, the value indicated by the remaining bits of the PRACH mask index is determined as the preset index number; and in a case that the most significant bit of the PRACH mask index is a second preset value, a value other than the value indicated by the remaining bits of the PRACH mask index is determined as the preset index number; where the first preset value and the second preset value are different.

Optionally, in the embodiments of the present disclosure, the configured RO resources within the preset time interval comprise: any RO resources among all RO resources configured by the network device within the preset time interval, or valid RO resources among all RO resources configured by the network device within the preset time interval.

According to the method for configuring the contention free random access resource provided by the embodiments of the present disclosure, since the user equipment can determine the target RO resource based on the received target resource indication information and the pre-defined mapping relationship, bit overhead needed for indicating an RO resource of a contention free access procedure can be reduced. In addition, the manner in which the physical random access channel transmission occasion (RO) resource is determined based on the correspondence between the value range of the target resource indication information and the RO resource is flexible, thus the flexibility of configuring the RO resource by the network device is improved.

The network device and the user equipment according to the embodiments of the present disclosure are described in detail hereinafter with reference to FIGS. 6 to 9.

Figure 6:
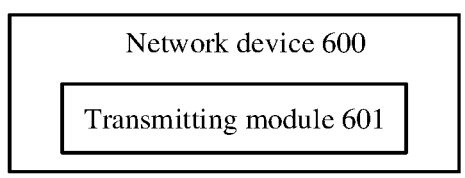
FIG. 6 is a schematic structural diagram of a network device 600 according to embodiments of the present disclosure.

FIG. 6 shows a schematic structural diagram of a network device provided by embodiments of the present disclosure. As shown in FIG. 6, the network device 600 includes a transmitting module 601.

The transmitting module 601 is configured to transmit target resource indication information to a user equipment based on a pre-defined mapping relationship; where the target resource indication information is used to determine a physical random access channel transmission occasion (RO) resource, the target resource indication information includes at least one of: a physical random access channel (PRACH) mask index or an RO resource index, and the pre-defined mapping relationship includes a correspondence between a value range of the target resource indication information and the RO resource.

Optionally, the pre-defined mapping relationship is pre-determined by the network device or specified by a protocol, and the pre-defined mapping relationship is related to an RO resource group.

Optionally, the RO resource group is obtained by grouping, based on a preset parameter, configured RO resources within a preset time interval; where the preset parameter includes one of: identifiers of the RO resources, time positions of the RO resources, frequency domain positions of the RO resources, a type of an associated object of the RO resources, or an association group, the type of the associated object includes a synchronization signal block (SSB) or a channel state information-reference signal (CSI-RS), and the association group is a set of RO resources needed for a complete mapping between RO resources and associated objects.

In a case that the preset parameter is the identifiers of the RO resources, the number of the RO resource group is equal to the number of the configured RO resources within the preset time interval.

Optionally, the preset time interval comprises: a configuration period for configuring RO resources by the network device or a synchronization period.

Optionally, the pre-defined mapping relationship includes one or more of the following relationships:

in a case that the value range of the target resource indication information is in a first preset interval, the corresponding RO resource comprises: all configured RO resources within a preset time interval;

in a case that the value range of the target resource indication information is in a second preset interval, the corresponding RO resource comprises: an RO resource associated with a preset associated object, in an odd-numbered RO resource group;

in a case that the value range of the target resource indication information is in a third preset interval, the corresponding RO resource comprises: an RO resource associated with a preset associated object, in an even-numbered RO resource group;

in a case that the value range of the target resource indication information is in a fourth preset interval, the corresponding RO resource comprises: an RO resource that is associated with a preset associated object and has an odd index number, in an odd-numbered RO resource group; and an RO resource that is associated with a preset associated object and has an even index number, in an even-numbered RO resource group;

in a case that the value range of the target resource indication information is in a fifth preset interval, the corresponding RO resource comprises: all RO resources associated with a preset associated object, in an $i^{th}$ subgroup of all RO resource groups, where i is determined according to a value of the target resource indication information, subgroups are obtained by equally dividing all the RO resource groups in sequence, and i is an integer greater than zero and less than or equal to the total number of the subgroups;

in a case that the value range of the target resource indication information is in a sixth preset interval, the corresponding RO resource comprises: RO resources in a $j^{th}$ subgroup among all RO resources associated with a preset associated object, from all RO resource groups, where j is determined according to a value of the target resource indication information, subgroups are obtained by equally dividing all the RO resources associated with the preset associated object in sequence, and j is an integer greater than zero and less than or equal to the total number of the subgroups;

in a case that the value range of the target resource indication information is in a seventh preset interval, the corresponding RO resource comprises: RO resources associated with a preset associated object, in a preset number of consecutive RO resource groups starting from a RO resource group having a preset serial number;

in a case that the value range of the target resource indication information is in an eighth preset interval, the corresponding RO resource comprises: all RO resources associated with a preset associated object, in a RO resource group having a preset serial number, where the preset serial number is determined according to a value of the target resource indication information;

in a case that the value range of the target resource indication information is in a ninth preset interval, the corresponding RO resource comprises: an RO resource that is associated with a preset associated object and has a preset index number, in all RO resource groups;

in a case that the value range of the target resource indication information is in a tenth preset interval, the corresponding RO resource comprises: an RO resource that is associated with a preset associated object and has a preset index number, in an odd-number RO resource group;

in a case that the value range of the target resource indication information is in an eleventh preset interval, the corresponding RO resource comprises: an RO resource that is associated with a preset associated object and has a preset index number, in an even-number RO resource group;

in a case that the value range of the target resource indication information is in a twelfth preset interval, the corresponding RO resource comprises: an RO resource that is associated with a preset associated object and has a preset index number, in a $k^{th}$ subgroup of all RO resource groups, where k is determined according to a value of the target resource indication information, subgroups are obtained by equally dividing all resource groups in sequence, and k is an integer greater than zero and less than or equal to the total number of the subgroups;

in a case that the value range of the target resource indication information is in a thirteenth preset interval, the corresponding RO resource comprises: an RO resource that is associated with a preset associated object and has a preset index number, in an RO resource group having a preset serial number, where the preset serial number is determined according to a value of the target resource indication information; or, in a case that the value range of the target resource indication information is in a fourteenth preset interval, the corresponding RO resource comprises: an RO resource that is associated with a preset associated object and has a preset index number, in a preset number of consecutive RO resource groups starting from a RO resource group having a preset serial number.

Optionally, the transmitting module 601 is configured to transmit the target resource indication information to the user equipment through a physical downlink control channel (PDCCH) or radio resource control (RRC).

Optionally, the PDCCH or the RRC further carries one or more associated object index numbers, the preset associated object is associated object(s) corresponding to the one or more associated object index numbers.

Optionally, the preset associated object includes multiple associated objects transmitted by the network device.

Optionally, the target resource indication information includes the PRACH mask index and does not include the RO resource index, and the preset index number is determined based on a value of a specified bit of the PRACH mask index and a value indicated by remaining bits of the PRACH mask index.

Optionally, when the specified bit is a most significant bit, in a case that the most significant bit of the PRACH mask index is a first preset value, the preset index number is the value indicated by the remaining bits of the PRACH mask index; and in a case that the most significant bit of the PRACH mask index is a second preset value, the preset index number is a value other than the value indicated by the remaining bits of the PRACH mask index; and where the first preset value and the second preset value are different.

Optionally, the configured RO resources within the preset time interval comprise: any RO resources among all configured RO resources within the preset time interval, or valid RO resources among all configured RO resources within the preset time interval.

According to the network device 600 provided by the embodiments of the present disclosure, indication of the RO resource can be achieved through transmitting the target resource indication information with less content to the user equipment, hence bit overhead needed for indicating an RO resource of a contention free access procedure can be reduced. In addition, the manner in which the physical random access channel transmission occasion (RO) resource is determined based on the correspondence between the value range of the target resource indication information and the RO resource is flexible, thus the flexibility of configuring the RO resource by the network device is improved.

The network device shown in FIG. 6 may be used to implement various embodiments of the method for configuring the contention free random access resource shown in FIG. 1. For related parts, reference can be made to the above method embodiments.

Figure 7:
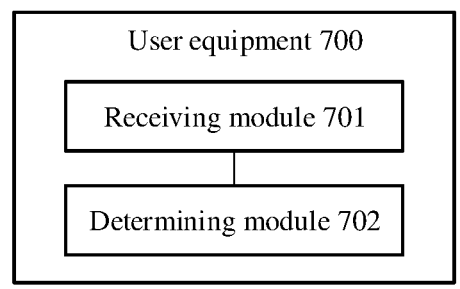
FIG. 7 is a schematic structural diagram of a user equipment 700 according to embodiments of the present disclosure.

FIG. 7 shows a schematic structural diagram of a user equipment provided by embodiments of the present disclosure. As shown in FIG. 7, the user equipment 700 includes: a receiving module 701 and a first determining module 702.

The receiving module 701 is configured to receive target resource indication information, where the target resource indication information is used to determine a physical random access channel transmission occasion (RO) resource, and the target resource indication information includes at least one of: a physical random access channel (PRACH) mask index or an RO resource index.

The first determining module 702 is configured to determine a target RO resource based on a value range of the target resource indication information and a pre-defined mapping relationship, where the pre-defined mapping relationship includes a correspondence between the value range of the target resource indication information and the RO resource.

Optionally, the first determining module includes: a candidate RO resource determination sub-module, a first target RO resource determination sub-module, a second target RO resource determination sub-module, and a third target RO resource determination sub-module.

The candidate RO resource determination sub-module is configured to determine a candidate RO resource that matches the value range of the target resource indication information based on the value range of the target resource indication information and the pre-defined mapping relationship.

The first target RO resource determination submodule is configured to: in a case that the number of candidate RO resource is equal to one, determine the candidate RO resource as the target RO resource.

The second target RO resource determination submodule is configured to: in a case that the number of candidate RO resource is greater than one, select, based on a first preset rule, one or more RO resources from the candidate RO resources as the target RO resource.

The third target RO resource determination sub-module is configured to: in a case that the number of candidate RO resource is equal to zero, select, based on a second preset rule, one or more RO resources from configured RO resources within a preset time interval, as the target RO resource.

Optionally, the second target RO resource determination submodule is specifically configured to:

select, from the candidate RO resources, one or more available RO resources closest to a current time, as the target RO resource; or, select, from the candidate RO resources, multiple available RO resources in a manner of frequency division multiplex (FDM) in a frequency domain, as the target RO resource; or, select, from the candidate RO resources, multiple available RO resources in a manner of time division multiplex (TDM) in a time domain, as the target RO resource.

Optionally, the third target RO resource determination submodule is specifically configured to:

select, from the configured RO resources within the preset time interval, one or more available RO resources closest to a current time, as the target RO resource; or, select, from the configured RO resources within the preset time interval, multiple available RO resources in a manner of frequency division multiplex (FDM) in a frequency domain, as the target RO resource; or, select, from the configured RO resources within the preset time interval, multiple available RO resources in a manner of time division multiplex (TDM) in a time domain, as the target RO resource.

Optionally, the pre-defined mapping relationship is configured by the network device for the user equipment or specified by a protocol, and the pre-defined mapping relationship is related to an RO resource group.

Optionally, the RO resource group is obtained by grouping, based on a preset parameter, configured RO resources within a preset time interval; where the preset parameter includes one of: identifiers of the RO resources, time positions of the RO resources, frequency domain positions of the RO resources, a type of an associated object of the RO resources, or an association group, the type of the associated object includes a synchronization signal block (SSB) or a channel state information-reference signal (CSI-RS), and the association group is a set of RO resources needed for a complete mapping between RO resources and associated objects.

In a case that the preset parameter is the identifiers of the RO resources, the number of the RO resource group is equal to the number of the configured RO resources within the preset time interval.

Optionally, the preset time interval includes: a configuration period for configuring RO resources by the network device or a synchronization period.

Optionally, the pre-defined mapping relationship includes one or more of the following relationships:

in a case that the value range of the target resource indication information is in a first preset interval, the corresponding RO resource comprises: all configured RO resources within a preset time interval by the network device;

in a case that the value range of the target resource indication information is in a second preset interval, the corresponding RO resource comprises: an RO resource associated with a preset associated object, in an odd-numbered RO resource group;

in a case that the value range of the target resource indication information is in a third preset interval, the corresponding RO resource comprises: an RO resource associated with a preset associated object, in an even-numbered RO resource group;

in a case that the value range of the target resource indication information is in a fourth preset interval, the corresponding RO resource comprises: an RO resource that is associated with a preset associated object and has an odd index number, in an odd-numbered RO resource group; and an RO resource that is associated with a preset associated object and has an even index number, in an even-numbered RO resource group;

in a case that the value range of the target resource indication information is in a fifth preset interval, the corresponding RO resource comprises: all RO resources associated with a preset associated object, in an $i^{th}$ subgroup of all RO resource groups, where i is determined according to a value of the target resource indication information, subgroups are obtained by equally dividing all the RO resource groups in sequence, and i is an integer greater than zero and less than or equal to the total number of the subgroups;

in a case that the value range of the target resource indication information is in a sixth preset interval, the corresponding RO resource comprises: RO resources in a $j^{th}$ subgroup among all RO resources associated with a preset associated object, from all RO resource groups, where j is determined according to a value of the target resource indication information, subgroups are obtained by equally dividing all the RO resources associated with the preset associated object in sequence, and j is an integer greater than zero and less than or equal to the total number of the subgroups;

in a case that the value range of the target resource indication information is in a seventh preset interval, the corresponding RO resource comprises: RO resources associated with a preset associated object, in a preset number of consecutive RO resource groups starting from a RO resource group having a preset serial number;

in a case that the value range of the target resource indication information is in an eighth preset interval, the corresponding RO resource comprises: all RO resources associated with a preset associated object, in a RO resource group having a preset serial number, where the preset serial number is determined according to a value of the target resource indication information;

in a case that the value range of the target resource indication information is in a ninth preset interval, the corresponding RO resource comprises: an RO resource that is associated with a preset associated object and has a preset index number, in all RO resource groups;

in a case that the value range of the target resource indication information is in a tenth preset interval, the corresponding RO resource comprises: an RO resource that is associated with a preset associated object and has a preset index number, in an odd-number RO resource group;

in a case that the value range of the target resource indication information is in an eleventh preset interval, the corresponding RO resource comprises: an RO resource that is associated with a preset associated object and has a preset index number, in an even-number RO resource group;

in a case that the value range of the target resource indication information is in a twelfth preset interval, the corresponding RO resource comprises: an RO resource that is associated with a preset associated object and has a preset index number, in a $k^{th}$ subgroup of all RO resource groups, where k is determined according to a value of the target resource indication information, subgroups are obtained by equally dividing all resource groups in sequence, and k is an integer greater than zero and less than or equal to the total number of the subgroups;

in a case that the value range of the target resource indication information is in a thirteenth preset interval, the corresponding RO resource comprises: an RO resource that is associated with a preset associated object and has a preset index number, in an RO resource group having a preset serial number, where the preset serial number is determined according to a value of the target resource indication information; or, in a case that the value range of the target resource indication information is in a fourteenth preset interval, the corresponding RO resource comprises: an RO resource that is associated with a preset associated object and has a preset index number, in a preset number of consecutive RO resource groups starting from a RO resource group having a preset serial number.

Optionally, the receiving module 701 is specifically configured to receive the target resource indication information carried in a physical downlink control channel (PDCCH) or radio resource control (RRC).

Optionally, the PDCCH or the RRC further carries one or more associated object index numbers, and the user equipment 700 may further include: a second determining module configured to determine, associated object(s) corresponding to the one or more associated object index numbers, as the preset associated object.

Optionally, the user equipment 700 may further include: a third determining module, configured to determine, multiple associated objects transmitted by the network device, as the preset associated object.

Optionally, the target resource indication information includes the PRACH mask index and does not include the RO resource index, and the user equipment 700 may further include: a fourth determining module, configured to determine the preset index number based on a value of a specified bit of the PRACH mask index and a value indicated by remaining bits of the PRACH mask index.

Optionally, the fourth determining module is specifically configured to: when the specified bit is the most significant bit, in a case that the most significant bit of the PRACH mask index is a first preset value, determine the value indicated by the remaining bits of the PRACH mask index as the preset index number; and in a case that the most significant bit of the PRACH mask index is a second preset value, determine a value other than the value indicated by the remaining bits of the PRACH mask index as the preset index number; where the first preset value and the second preset value are different.

Optionally, the configured RO resources within the preset time interval comprise: any RO resources among all RO resources configured by the network device within the preset time interval, or valid RO resources among all RO resources configured by the network device within the preset time interval.

According to the user equipment 700 provided by the embodiments of the present disclosure, the target RO resource can be determined based on the received target resource indication information and the pre-defined mapping relationship, hence bit overhead needed for indicating an RO resource of a contention free access procedure can be reduced. In addition, the manner in which the physical random access channel transmission occasion (RO) resource is determined based on the correspondence between the value range of the target resource indication information and the RO resource is flexible, thus the flexibility of configuring the RO resource by the network device is improved.

The user equipment shown in FIG. 7 may be used to implement the various embodiments of the method for configuring the contention free random access resource shown in FIG. 5. For related parts, reference can be made to the above method embodiments.

Figure 8:
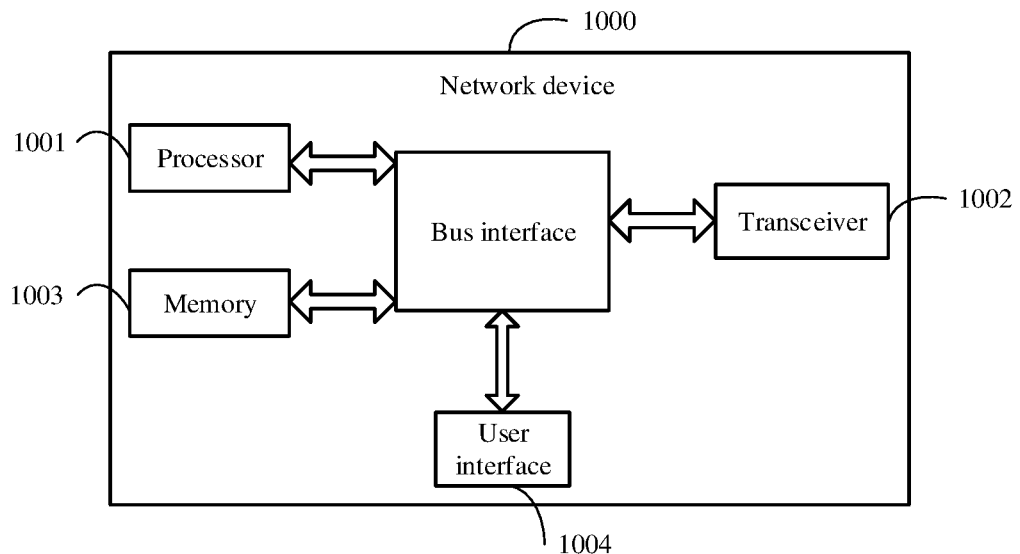
FIG. 8 is a schematic structural diagram of a network device 800 according to embodiments of the present disclosure.

Reference is made to FIG. 8. FIG. 8 is a structural diagram of a network device to which embodiments of the present disclosure are applied. The network device can implement the details of the above method for configuring the contention free random access resource and achieve the same effects. As shown in FIG. 8, the network device 800 includes: a processor 801, a transceiver 802, a memory 803, a user interface 804, and a bus interface.

In the embodiments of the present disclosure, the network device 800 further includes: a program stored in the memory 803 and executable by the processor 801, and the program, when being executed by the processor 801, performs various process of the above method for configuring the contention free random access resource, which can achieve the same technical effects. To avoid repetition, descriptions are not repeated herein.

In FIG. 8, the bus architecture may include any number of interconnected buses and bridges, and various circuits such as one or more processors represented by the processor 801 and a memory represented by the memory 803 are connected to each other. The bus architecture may connect a variety of other circuits such as a peripheral, a voltage regulator and a power management circuit to each other, which is well known in the art, thus no further description thereof is provided herein. The bus interface is used to provide an interface. The transceiver 802 may include multiple components, i.e., a transmitter and a receiver, which is used to provide a unit for communicating with other devices via a transmission medium. For different user equipments, the user interface 804 may be an interface capable of connecting externally or internally to a required device, and the device which may be connected includes, but is not limited to: keypad, display, speaker, microphone, joystick and the like.

The processor 801 is responsible for managing the bus architecture and normal operations, and the memory 803 may store data being used by the processor 801 during operation.

Figure 9:
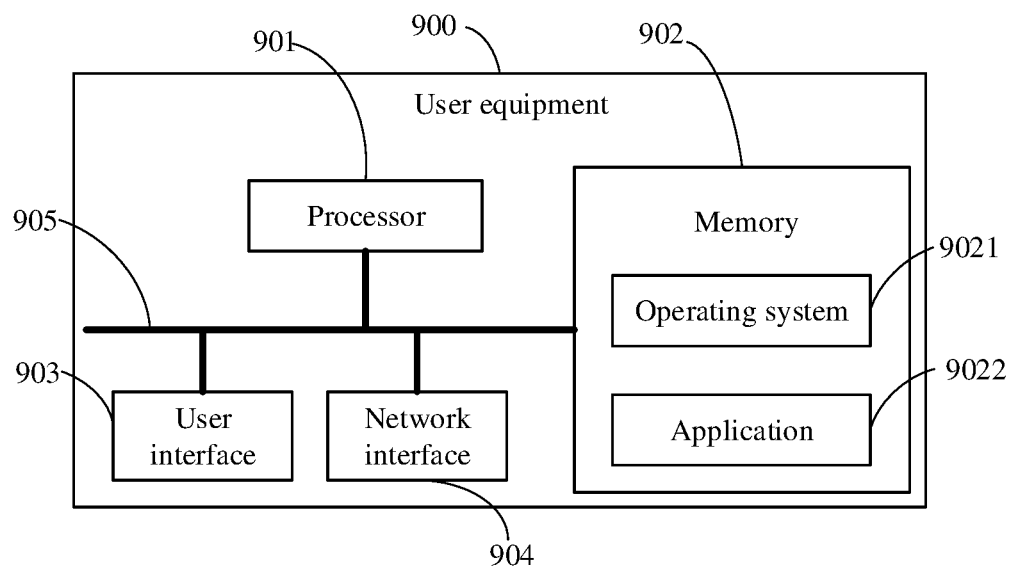
FIG. 9 is a schematic structural diagram of a user equipment 900 according to embodiments of the present disclosure.

FIG. 9 is a block diagram of a user equipment according to another embodiment of the present disclosure. The user equipment 900 shown in FIG. 9 includes: at least one processor 901, a memory 902, at least one network interface 904, and a user interface 903. The various components in the user equipment 900 are coupled together through a bus system 905. It can be understood that the bus system 905 is configured to implement connection and communication between these components. In addition to a data bus, the bus system 905 includes a power bus, a control bus, and a state signal bus. However, for clarity, various buses are marked as the bus system 905 in FIG. 9.

The user interface 903 may include a display, a keyboard, a clicking device (such as, a mouse, or a trackball), a touch pad, or a touch screen.

It can be understood that the memory 902 in the embodiments of the present disclosure may be a volatile memory or a non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (Random Access Memory, RAM) that acts as a high-speed external cache. By way of example and not limitation, various kinds of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SDRAM) or a direct rambus random access memory (Direct Rambus RAM, DRRAM). The memory 902 in the system and the method of the embodiments of the present disclosure is intended to include, without being limited to, these and any other suitable types of memories.

In some implementations, the memory 902 stores the following elements, executable modules or data structures, or a subset thereof, or an extended set thereof: operating system 9021 and application 9022.

The operating system 9021 includes various system programs such as a framework layer, a core library layer and a driving layer, for implementing various fundamental services and processing hardware-based tasks. The application 9022 includes various applications such as media player and browser, for implementing various application services. A program for implementing the method according to the embodiments of the present disclosure may be included in the application 9022.

In the embodiments of the present disclosure, the user equipment 900 further includes: a program stored in the memory 902 and executable by the processor 901, and the program, when being executed by the processor 901, performs various processes of the above method for configuring the contention free random access resource, which can achieve the same technical effects. To avoid repetition, descriptions are not repeated herein.

The methods according to the above embodiments of the present disclosure may be applied to the processor 901 or implemented by the processor 901. The processor 901 may be an integrated circuit chip with signal processing capabilities. In implementation, each step of the above methods may be completed by an integrated logic circuit in form of hardware in the processor 901 or instructions in form of software. The processor 901 above may be a general-purpose processor, a digital signal processor ((Digital Signal Processor, DSP), an application specific integrated circuit (Application Specific Integrated Circuit, ASIC), a field programmable gate array (Field Programmable Gate Array, FPGA) or any other programmable logic device, a discrete gate, a transistor logic device or a discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module may be located in a conventional well-developed computer readable storage medium such as a random access memory, a flash memory, a read-only memory, a programmable read-only memory, an electrically erasable programmable memory, a register, or the like. The computer readable storage medium is located in the memory 902, and the processor 901 reads the information in the memory 902 and completes the steps of the above methods in combination with its hardware. Specifically, a program is stored in the computer readable storage medium, and when the program is executed by the processor, the steps of the embodiments of the method for configuring the contention free random access resource are implemented.

It can be understood that the embodiments described herein may be implemented in hardware, software, firmware, middleware, microcode, or a combination thereof. For hardware implementation, the processing unit may be implemented in at least one application specific integrated circuit (Application Specific Integrated Circuits, ASIC), digital signal processor (Digital Signal Processing, DSP), digital signal processing device (DSP Device, DSPD), programmable logic device (Programmable Logic Device, PLD), field-programmable gate array (Field-Programmable Gate Array, FPGA), general purpose processor, controller, microcontroller, microprocessor, other electronic unit for performing the functions according to the present disclosure or a combination thereof.

For software implementation, the technical solutions according to the embodiments of the present disclosure may be implemented by modules (e.g., processes, functions, and so on) for performing the functions according to the embodiments of the present disclosure. Software codes may be stored in a memory and executed by a processor. The memory may be implemented in the processor or external to the processor.

Embodiments of the present disclosure also provide a computer readable storage medium, having a program stored thereon. When the program is executed by a processor, various processes of the embodiments of the method for configuring the contention free random access resource described above are implemented, which can achieve the same technical effects. To avoid repetition, details are not repeated herein. The computer readable storage medium may be, for example, a read-only memory (Read-Only Memory, ROM), a random access memory (Random Access Memory, RAM), a magnetic disk or an optical disk, etc.

The embodiments of the present disclosure also provide a program product including instructions. When a computer runs the instructions of the program product, the computer performs the above method for configuring the contention free random access resource. Specifically, the program product may run on the network device.

Those skilled in the art will appreciate that the units and the algorithm steps described in conjunction with the embodiments according to the present disclosure may be implemented in the form of electronic hardware or a combination of computer software and electronic hardware. Whether these functions are performed in hardware or in software depends on the specific application and design constraints of the technical solution. Those skilled in the art may use different methods to implement the described functions for each particular application, and such implementations are not to be considered as departing from the scope of the present disclosure.

Those skilled in the art can clearly understand that, for the sake of easiness and conciseness of description, reference can be made to the corresponding processes in the foregoing method embodiments for specific operating processes of the systems, the devices and the units described above, and a repeated description thereof is omitted herein.

In some embodiments provided in the present disclosure, it should be understood that the disclosed devices and methods may be implemented in other ways. For example, the described embodiments directed to the devices are merely exemplary. For example, the units are divided merely in logical function, which may be divided in another way in actual implementation, e.g., multiple units or components may be combined or integrated into another device, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the object of the technical solutions of the embodiments of the present disclosure.

In addition, functional units in various embodiments of the present disclosure may be integrated into one processing unit, or may be physically independent, or two or more units may be integrated into one unit.

If the function is implemented in the form of a software functional unit, and sold or used as a standalone product, it may be stored in a computer readable storage medium. Based on this understanding, essence of the technical solution of the present disclosure, or the part contributing to the related technologies, or all or part of the technical solution, may be embodied in the form of a software product. The computer software product is stored in a storage medium, and the software product includes a number of instructions to enable a computer device (which may be a personal computer, a server, or a network device, etc.) to perform all or part of the steps of the method described in the various embodiments of the present disclosure. The storage medium includes a USB flash disk, a mobile hard disk, a read-only memory (Read-Only Memory, ROM), a random access memory (Random Access Memory, RAM), a magnetic disk, an optical disk, and other medium which can store program code.

The above descriptions merely illustrate specific implementations of the present disclosure, and the protection scope of the present disclosure is not limited thereto. Any modification or substitution made by those skilled in the art without departing from the technical scope of the present disclosure shall fall within the protection scope of the present disclosure. Therefore, the protection scope of the present disclosure is determined by the protection scope of the claims.

What is claimed is:

1. A method for configuring a contention free random access resource, applied to a user equipment, comprising:
receiving target resource indication information, wherein the target resource indication information is used to determine a physical random access channel transmission occasion (RO) resource, and the target resource indication information comprises at least one of: a physical random access channel (PRACH) mask index or an RO resource index; and
determining a target RO resource based on a value range of the target resource indication information and a pre-defined mapping relationship, wherein the pre-defined mapping relationship comprises a correspondence between the value range of the target resource indication information and the RO resource;
wherein the determining the target RO resource based on the value range of the target resource indication information and the pre-defined mapping relationship comprises:
determining a candidate RO resource that matches the value range of the target resource indication information based on the value range of the target resource indication information and the pre-defined mapping relationship;
in a case that the number of candidate RO resource is equal to one, determining the candidate RO resource as the target RO resource;
in a case that the number of candidate RO resource is greater than one, selecting, based on a first preset rule, one or more RO resources from the candidate RO resources as the target RO resource; and
in a case that the number of candidate RO resource is equal to zero, selecting, based on a second preset rule, one or more RO resources from configured RO resources within a preset time interval, as the target RO resource.

2. The method according to claim 1, wherein the selecting, based on the first preset rule, the one or more RO resources from the candidate RO resources as the target RO resource comprises:
selecting, from the candidate RO resources, one or more available RO resources closest to a current time, as the target RO resource; or,
selecting, from the candidate RO resources, a plurality of available RO resources in a manner of frequency division multiplex (FDM) in a frequency domain, as the target RO resource; or,
selecting, from the candidate RO resources, a plurality of available RO resources in a manner of time division multiplex (TDM) in a time domain, as the target RO resource.

3. The method according to claim 1, wherein the selecting, based on the second preset rule, the one or more RO resources from the configured RO resources within the preset time interval, as the target RO resource comprises:
selecting, from the configured RO resources within the preset time interval, one or more available RO resources closest to a current time, as the target RO resource; or,
selecting, from the configured RO resources within the preset time interval, a plurality of available RO resources in a manner of frequency division multiplex (FDM) in a frequency domain, as the target RO resource; or,
selecting, from the configured RO resources within the preset time interval, a plurality of available RO resources in a manner of time division multiplex (TDM) in a time domain, as the target RO resource.

4. The method according to claim 1, wherein the pre-defined mapping relationship is configured by the network device for the user equipment or specified by a protocol, and the pre-defined mapping relationship is related to an RO resource group;
wherein the RO resource group is obtained by grouping, based on a preset parameter, configured RO resources within a preset time interval;
wherein the preset parameter comprises one of: identifiers of the RO resources, time positions of the RO resources, frequency domain positions of the RO resources, a type of an associated object of the RO resources, or an association group, the type of the associated object comprises a synchronization signal block (SSB) or a channel state information-reference signal (CSI-RS), and the association group is a set of RO resources needed for achieving a complete mapping between RO resources and associated objects; and
in a case that the preset parameter is the identifiers of the RO resources, the number of the RO resource group is equal to the number of the configured RO resources within the preset time interval.

5. The method according to claim 4, wherein the pre-defined mapping relationship comprises one or more of the following relationships:
in a case that the value range of the target resource indication information is in a first preset interval, the corresponding RO resource comprises: all configured RO resources within a preset time interval by the network device;
in a case that the value range of the target resource indication information is in a second preset interval, the corresponding RO resource comprises: an RO resource associated with a preset associated object, in an odd-numbered RO resource group;
in a case that the value range of the target resource indication information is in a third preset interval, the corresponding RO resource comprises: an RO resource associated with a preset associated object, in an even-numbered RO resource group;
in a case that the value range of the target resource indication information is in a fourth preset interval, the corresponding RO resource comprises: an RO resource that is associated with a preset associated object and has an odd index number, in an odd-numbered RO resource group;
and an RO resource that is associated with a preset associated object and has an even index number, in an even-numbered RO resource group;
in a case that the value range of the target resource indication information is in a fifth preset interval, the corresponding RO resource comprises: all RO resources associated with a preset associated object, in an $i^{th}$ subgroup of all RO resource groups, wherein i is determined according to a value of the target resource indication information, subgroups are obtained by equally dividing all the RO resource groups, and i is an integer greater than zero and less than or equal to the total number of the subgroups;
in a case that the value range of the target resource indication information is in a sixth preset interval, the corresponding RO resource comprises: RO resources in a $j^{th}$ subgroup among all RO resources associated with a preset associated object, from all RO resource groups, wherein j is determined according to a value of the target resource indication information, subgroups are obtained by equally dividing all the RO resources associated with the preset associated object, and j is an integer greater than zero and less than or equal to the total number of the subgroups;

in a case that the value range of the target resource indication information is in a seventh preset interval, the corresponding RO resource comprises: RO resources associated with a preset associated object, in a preset number of consecutive RO resource groups starting from a RO resource group having a preset serial number;

in a case that the value range of the target resource indication information is in an eighth preset interval, the corresponding RO resource comprises: all RO resources associated with a preset associated object, in a RO resource group having a preset serial number, wherein the preset serial number is determined according to a value of the target resource indication information;

in a case that the value range of the target resource indication information is in a ninth preset interval, the corresponding RO resource comprises: an RO resource that is associated with a preset associated object and has a preset index number, in all RO resource groups;

in a case that the value range of the target resource indication information is in a tenth preset interval, the corresponding RO resource comprises: an RO resource that is associated with a preset associated object and has a preset index number, in an odd-number RO resource group;

in a case that the value range of the target resource indication information is in an eleventh preset interval, the corresponding RO resource comprises: an RO resource that is associated with a preset associated object and has a preset index number, in an even-number RO resource group;

in a case that the value range of the target resource indication information is in a twelfth preset interval, the corresponding RO resource comprises: an RO resource that is associated with a preset associated object and has a preset index number, in a $k^{th}$ subgroup of all RO resource groups, wherein k is determined according to a value of the target resource indication information, subgroups are obtained by equally dividing all resource groups, and k is an integer greater than zero and less than or equal to the total number of the subgroups;

in a case that the value range of the target resource indication information is in a thirteenth preset interval, the corresponding RO resource comprises: an RO resource that is associated with a preset associated object and has a preset index number, in an RO resource group having a preset serial number, wherein the preset serial number is determined according to a value of the target resource indication information; or, in a case that the value range of the target resource indication information is in a fourteenth preset interval, the corresponding RO resource comprises: an RO resource that is associated with a preset associated object and has a preset index number, in a preset number of consecutive RO resource groups starting from a RO resource group having a preset serial number.

6. The method according to claim 5, wherein the receiving the target resource indication information comprises: receiving the target resource indication information carried in a physical downlink control channel (PDCCH) or radio resource control (RRC).

7. The method according to claim 5, wherein the target resource indication information comprises the PRACH mask index and does not comprise the RO resource index, and the method further comprises: determining the preset index number based on a value of a specified bit of the PRACH mask index and a value indicated by remaining bits of the PRACH mask index.

8. A user equipment, comprising a memory, a processor, and a program stored in the memory and executable by the processor, wherein the program, when being executed by the processor, performs the following steps:

receiving target resource indication information, wherein the target resource indication information is used to determine a physical random access channel transmission occasion (RO) resource, and the target resource indication information comprises at least one of: a physical random access channel (PRACH) mask index or an RO resource index; and determining a target RO resource based on a value range of the target resource indication information and a pre-defined mapping relationship, wherein the pre-defined mapping relationship comprises a correspondence between the value range of the target resource indication information and the RO resource;

wherein the determining the target RO resource based on the value range of the target resource indication information and the pre-defined mapping relationship comprises:

determining a candidate RO resource that matches the value range of the target resource indication information based on the value range of the target resource indication information and the pre-defined mapping relationship;

in a case that the number of candidate RO resource is equal to one, determining the candidate RO resource as the target RO resource;

in a case that the number of candidate RO resource is greater than one, selecting, based on a first preset rule, one or more RO resources from the candidate RO resources as the target RO resource; and in a case that the number of candidate RO resource is equal to zero, selecting, based on a second preset rule, one or more RO resources from configured RO resources within a preset time interval, as the target RO resource.

9. The user equipment according to claim 8, wherein the selecting, based on the first preset rule, the one or more RO resources from the candidate RO resources as the target RO resource comprises:

selecting, from the candidate RO resources, one or more available RO resources closest to a current time, as the target RO resource; or, selecting, from the candidate RO resources, a plurality of available RO resources in a manner of frequency division multiplex (FDM) in a frequency domain, as the target RO resource; or, selecting, from the candidate RO resources, a plurality of available RO resources in a manner of time division multiplex (TDM) in a time domain, as the target RO resource.

10. The user equipment according to claim 8, wherein the selecting, based on the second preset rule, the one or more RO resources from the configured RO resources within the preset time interval, as the target RO resource comprises:

selecting, from the configured RO resources within the preset time interval, one or more available RO resources closest to a current time, as the target RO resource; or, selecting, from the configured RO resources within the preset time interval, a plurality of available RO resources in a manner of frequency division multiplex (FDM) in a frequency domain, as the target RO resource; or, selecting, from the configured RO resources within the preset time interval, a plurality of available RO resources in a manner of time division multiplex (TDM) in a time domain, as the target RO resource.

11. The user equipment according to claim 8, wherein the pre-defined mapping relationship is configured by the network device for the user equipment or specified by a protocol, and the pre-defined mapping relationship is related to an RO resource group;

wherein the RO resource group is obtained by grouping, based on a preset parameter, configured RO resources within a preset time interval;

wherein the preset parameter comprises one of: identifiers of the RO resources, time positions of the RO resources, frequency domain positions of the RO resources, a type of an associated object of the RO resources, or an association group, the type of the associated object comprises a synchronization signal block (SSB) or a channel state information-reference signal (CSI-RS), and the association group is a set of RO resources needed for achieving a complete mapping between RO resources and associated objects; and in a case that the preset parameter is the identifiers of the RO resources, the number of the RO resource group is equal to the number of the configured RO resources within the preset time interval.

12. The user equipment according to claim 11, wherein the pre-defined mapping relationship comprises one or more of the following relationships:

in a case that the value range of the target resource indication information is in a first preset interval, the corresponding RO resource comprises: all configured RO resources within a preset time interval by the network device;

in a case that the value range of the target resource indication information is in a second preset interval, the corresponding RO resource comprises: an RO resource associated with a preset associated object, in an odd-numbered RO resource group;

in a case that the value range of the target resource indication information is in a third preset interval, the corresponding RO resource comprises: an RO resource associated with a preset associated object, in an even-numbered RO resource group;

in a case that the value range of the target resource indication information is in a fourth preset interval, the corresponding RO resource comprises: an RO resource that is associated with a preset associated object and has an odd index number, in an odd-numbered RO resource group; and an RO resource that is associated with a preset associated object and has an even index number, in an even-numbered RO resource group;

in a case that the value range of the target resource indication information is in a fifth preset interval, the corresponding RO resource comprises: all RO resources associated with a preset associated object, in an $i^{th}$ subgroup of all RO resource groups, wherein i is determined according to a value of the target resource indication information, subgroups are obtained by equally dividing all the RO resource groups, and i is an integer greater than zero and less than or equal to the total number of the subgroups;

in a case that the value range of the target resource indication information is in a sixth preset interval, the corresponding RO resource comprises: RO resources in a $j^{th}$ subgroup among all RO resources associated with a preset associated object, from all RO resource groups, wherein j is determined according to a value of the target resource indication information, subgroups are obtained by equally dividing all the RO resources associated with the preset associated object, and j is an integer greater than zero and less than or equal to the total number of the subgroups;

in a case that the value range of the target resource indication information is in a seventh preset interval, the corresponding RO resource comprises: RO resources associated with a preset associated object, in a preset number of consecutive RO resource groups starting from a RO resource group having a preset serial number;

in a case that the value range of the target resource indication information is in an eighth preset interval, the corresponding RO resource comprises: all RO resources associated with a preset associated object, in a RO resource group having a preset serial number, wherein the preset serial number is determined according to a value of the target resource indication information;

in a case that the value range of the target resource indication information is in a ninth preset interval, the corresponding RO resource comprises: an RO resource that is associated with a preset associated object and has a preset index number, in all RO resource groups;

in a case that the value range of the target resource indication information is in a tenth preset interval, the corresponding RO resource comprises: an RO resource that is associated with a preset associated object and has a preset index number, in an odd-number RO resource group;

in a case that the value range of the target resource indication information is in an eleventh preset interval, the corresponding RO resource comprises: an RO resource that is associated with a preset associated object and has a preset index number, in an even-number RO resource group;

in a case that the value range of the target resource indication information is in a twelfth preset interval, the corresponding RO resource comprises: an RO resource that is associated with a preset associated object and has a preset index number, in a $k^{th}$ subgroup of all RO resource groups, wherein k is determined according to a value of the target resource indication information, subgroups are obtained by equally dividing all resource groups, and k is an integer greater than zero and less than or equal to the total number of the subgroups;

in a case that the value range of the target resource indication information is in a thirteenth preset interval, the corresponding RO resource comprises: an RO resource that is associated with a preset associated object and has a preset index number, in an RO resource group having a preset serial number, wherein the preset serial number is determined according to a value of the target resource indication information; or, in a case that the value range of the target resource indication information is in a fourteenth preset interval, the corresponding RO resource comprises: an RO resource that is associated with a preset associated object and has a preset index number, in a preset number of consecutive RO resource groups starting from a RO resource group having a preset serial number.

13. The user equipment according to claim 12, wherein the receiving the target resource indication information comprises: receiving the target resource indication information carried in a physical downlink control channel (PDCCH) or radio resource control (RRC).

14. The user equipment according to claim 12, wherein the target resource indication information comprises the PRACH mask index and does not comprise the RO resource index, and the program, when being executed by the processor, further performs the following step: determining the preset index number based on a value of a specified bit of the PRACH mask index and a value indicated by remaining bits of the PRACH mask index.

15. A non-transitory computer-readable storage medium, wherein the non-transitory computer-readable storage medium stores a program, and the program, when being executed by a processor, causes the processor to implement the following steps:
receiving target resource indication information, wherein the target resource indication information is used to determine a physical random access channel transmission occasion (RO) resource, and the target resource indication information comprises at least one of: a physical random access channel (PRACH) mask index or an RO resource index; and
determining a target RO resource based on a value range of the target resource indication information and a pre-defined mapping relationship, wherein the pre-defined mapping relationship comprises a correspondence between the value range of the target resource indication information and the RO resource;
wherein the determining the target RO resource based on the value range of the target resource indication information and the pre-defined mapping relationship comprises:
determining a candidate RO resource that matches the value range of the target resource indication information based on the value range of the target resource indication information and the pre-defined mapping relationship;
in a case that the number of candidate RO resource is equal to one, determining the candidate RO resource as the target RO resource;
in a case that the number of candidate RO resource is greater than one, selecting, based on a first preset rule, one or more RO resources from the candidate RO resources as the target RO resource; and
in a case that the number of candidate RO resource is equal to zero, selecting, based on a second preset rule, one or more RO resources from configured RO resources within a preset time interval, as the target RO resource.

16. The non-transitory computer-readable storage medium according to claim 15, wherein the selecting, based on the first preset rule, the one or more RO resources from the candidate RO resources as the target RO resource comprises:
selecting, from the candidate RO resources, one or more available RO resources closest to a current time, as the target RO resource; or,
selecting, from the candidate RO resources, a plurality of available RO resources in a manner of frequency division multiplex (FDM) in a frequency domain, as the target RO resource; or,
selecting, from the candidate RO resources, a plurality of available RO resources in a manner of time division multiplex (TDM) in a time domain, as the target RO resource.

17. The non-transitory computer-readable storage medium according to claim 15, wherein the selecting, based on the second preset rule, the one or more RO resources from the configured RO resources within the preset time interval, as the target RO resource comprises:
selecting, from the configured RO resources within the preset time interval, one or more available RO resources closest to a current time, as the target RO resource; or,
selecting, from the configured RO resources within the preset time interval, a plurality of available RO resources in a manner of frequency division multiplex (FDM) in a frequency domain, as the target RO resource; or,
selecting, from the configured RO resources within the preset time interval, a plurality of available RO resources in a manner of time division multiplex (TDM) in a time domain, as the target RO resource.

18. The non-transitory computer-readable storage medium according to claim 15, wherein the pre-defined mapping relationship is configured by the network device for the user equipment or specified by a protocol, and the pre-defined mapping relationship is related to an RO resource group;
wherein the RO resource group is obtained by grouping, based on a preset parameter, configured RO resources within a preset time interval;
wherein the preset parameter comprises one of: identifiers of the RO resources, time positions of the RO resources, frequency domain positions of the RO resources, a type of an associated object of the RO resources, or an association group, the type of the associated object comprises a synchronization signal block (SSB) or a channel state information-reference signal (CSI-RS), and the association group is a set of RO resources needed for achieving a complete mapping between RO resources and associated objects; and
in a case that the preset parameter is the identifiers of the RO resources, the number of the RO resource group is equal to the number of the configured RO resources within the preset time interval.

19. The non-transitory computer-readable storage medium according to claim 18, wherein the pre-defined mapping relationship comprises one or more of the following relationships:
in a case that the value range of the target resource indication information is in a first preset interval, the corresponding RO resource comprises: all configured RO resources within a preset time interval by the network device;
in a case that the value range of the target resource indication information is in a second preset interval, the corresponding RO resource comprises: an RO resource associated with a preset associated object, in an odd-numbered RO resource group;
in a case that the value range of the target resource indication information is in a third preset interval, the corresponding RO resource comprises: an RO resource associated with a preset associated object, in an even-numbered RO resource group;

in a case that the value range of the target resource indication information is in a fourth preset interval, the corresponding RO resource comprises: an RO resource that is associated with a preset associated object and has an odd index number, in an odd-numbered RO resource group;

and an RO resource that is associated with a preset associated object and has an even index number, in an even-numbered RO resource group;

in a case that the value range of the target resource indication information is in a fifth preset interval, the corresponding RO resource comprises: all RO resources associated with a preset associated object, in an $i^{th}$ subgroup of all RO resource groups, wherein i is determined according to a value of the target resource indication information, subgroups are obtained by equally dividing all the RO resource groups, and i is an integer greater than zero and less than or equal to the total number of the subgroups;

in a case that the value range of the target resource indication information is in a sixth preset interval, the corresponding RO resource comprises: RO resources in a $j^{th}$ subgroup among all RO resources associated with a preset associated object, from all RO resource groups, wherein j is determined according to a value of the target resource indication information, subgroups are obtained by equally dividing all the RO resources associated with the preset associated object, and j is an integer greater than zero and less than or equal to the total number of the subgroups;

in a case that the value range of the target resource indication information is in a seventh preset interval, the corresponding RO resource comprises: RO resources associated with a preset associated object, in a preset number of consecutive RO resource groups starting from a RO resource group having a preset serial number;

in a case that the value range of the target resource indication information is in an eighth preset interval, the corresponding RO resource comprises: all RO resources associated with a preset associated object, in a RO resource group having a preset serial number, wherein the preset serial number is determined according to a value of the target resource indication information;

in a case that the value range of the target resource indication information is in a ninth preset interval, the corresponding RO resource comprises: an RO resource that is associated with a preset associated object and has a preset index number, in all RO resource groups;

in a case that the value range of the target resource indication information is in a tenth preset interval, the corresponding RO resource comprises: an RO resource that is associated with a preset associated object and has a preset index number, in an odd-number RO resource group;

in a case that the value range of the target resource indication information is in an eleventh preset interval, the corresponding RO resource comprises: an RO resource that is associated with a preset associated object and has a preset index number, in an even-number RO resource group;

in a case that the value range of the target resource indication information is in a twelfth preset interval, the corresponding RO resource comprises: an RO resource that is associated with a preset associated object and has a preset index number, in a $k^{th}$ subgroup of all RO resource groups, wherein k is determined according to a value of the target resource indication information, subgroups are obtained by equally dividing all resource groups, and k is an integer greater than zero and less than or equal to the total number of the subgroups;

in a case that the value range of the target resource indication information is in a thirteenth preset interval, the corresponding RO resource comprises: an RO resource that is associated with a preset associated object and has a preset index number, in an RO resource group having a preset serial number, wherein the preset serial number is determined according to a value of the target resource indication information; or, in a case that the value range of the target resource indication information is in a fourteenth preset interval, the corresponding RO resource comprises: an RO resource that is associated with a preset associated object and has a preset index number, in a preset number of consecutive RO resource groups starting from a RO resource group having a preset serial number.

20. The non-transitory computer-readable storage medium according to claim 19, wherein the receiving the target resource indication information comprises: receiving the target resource indication information carried in a physical downlink control channel (PDCCH) or radio resource control (RRC).

* * * * *